(12) United States Patent
Wieckowski et al.

(10) Patent No.: US 11,772,281 B1
(45) Date of Patent: Oct. 3, 2023

(54) VACUUM-ACTUATED END OF ARM TOOLS WITH SUCTION CUPS AND EXTENDIBLE PISTONS

(71) Applicant: Amazon Technologies, Inc., Seattle, WA (US)

(72) Inventors: Noah Scott Wieckowski, Boston, MA (US); Gregory Coleman, Somerville, MA (US)

(73) Assignee: Amazon Technologies, Inc., Seattle, WA (US)

( * ) Notice: Subject to any disclaimer, the term of this patent is extended or adjusted under 35 U.S.C. 154(b) by 351 days.

(21) Appl. No.: 17/067,305

(22) Filed: Oct. 9, 2020

(51) Int. Cl.
*B25J 15/06* (2006.01)

(52) U.S. Cl.
CPC ........ *B25J 15/0658* (2013.01); *B25J 15/0683* (2013.01)

(58) Field of Classification Search
CPC ............... B25J 15/0616; B25J 15/0641; B25J 15/0658; B65G 47/912
USPC ................................................ 294/183, 187
See application file for complete search history.

(56) References Cited

U.S. PATENT DOCUMENTS

| | | | |
|---|---|---|---|
| 2,247,787 A | 7/1941 | Schmidt | |
| 2,341,521 A | 2/1944 | Leonard et al. | |
| 2,995,359 A | 8/1961 | Gulick | |
| 3,424,486 A * | 1/1969 | Clifton | B25B 11/007 294/187 |
| 3,702,698 A * | 11/1972 | Schwebel | B65H 3/0883 271/103 |
| 4,266,905 A | 5/1981 | Birk et al. | |
| 4,736,938 A * | 4/1988 | Jiruse | B65H 3/0883 271/90 |
| 4,787,812 A | 11/1988 | Gopfert | |
| 6,161,886 A * | 12/2000 | Furuya | H05K 13/0409 294/183 |
| 7,017,961 B1 | 3/2006 | Parnell et al. | |
| 7,222,901 B2 * | 5/2007 | Gebauer | B66C 1/0293 294/64.2 |
| 7,374,217 B2 * | 5/2008 | Pabst | B65G 47/91 251/339 |

(Continued)

FOREIGN PATENT DOCUMENTS

CN 107671876 A 2/2018

OTHER PUBLICATIONS

Vacuforce, "Vacuum Pick Up Cylinders," Vacuforce LLC, Copyright 2020, https://pneuforce.com/vacuum-pick-up-cylinders. Accessed Oct. 9, 2020, 4 pages.

*Primary Examiner* — Dean J Kramer
(74) *Attorney, Agent, or Firm* — Athorus, PLLC

(57) ABSTRACT

Systems and methods to grasp objects using vacuum-actuated end of arm tools may include extending pistons and suction cups. For example, responsive to application of negative pressure, a piston may move from a retracted position to an extended position. In addition, responsive to grasping an object by a suction cup, the piston may remain in the extended position due to continued generation of pressure differentials that apply forces to the piston toward the extended position. Alternatively, a piston may be biased toward an extended position due to a spring force, and may remain in the extended position responsive to grasping an object. In the extended position of the piston, an object may be grasped with an amount of passive compliance to external forces that may be applied to the object.

20 Claims, 13 Drawing Sheets

(56) References Cited

U.S. PATENT DOCUMENTS

2015/0151436 A1\* 6/2015 Wang .................. B25J 15/0633
                                                           294/183
2019/0240813 A1\* 8/2019 Nakayama ............ B25B 11/005
2020/0078939 A1   3/2020 Jeong et al.

\* cited by examiner

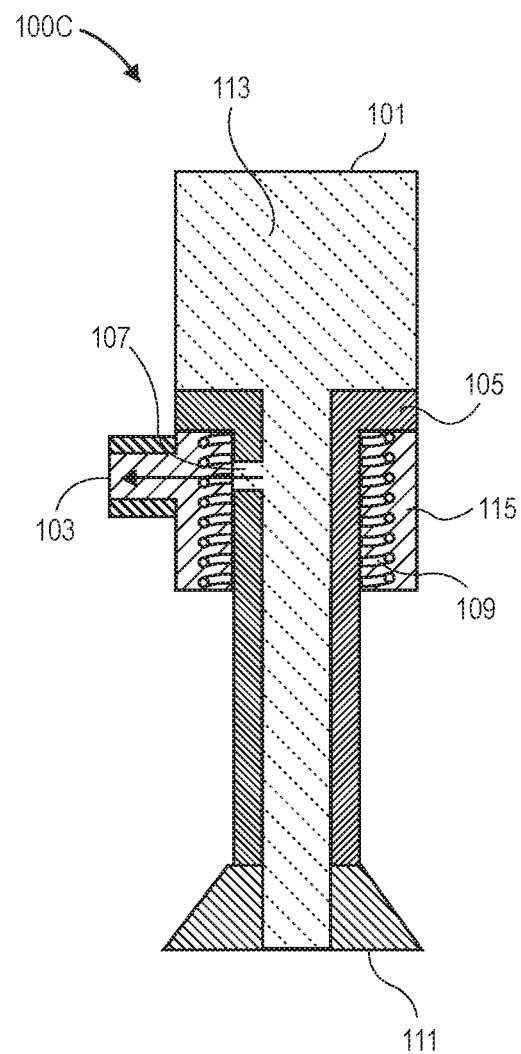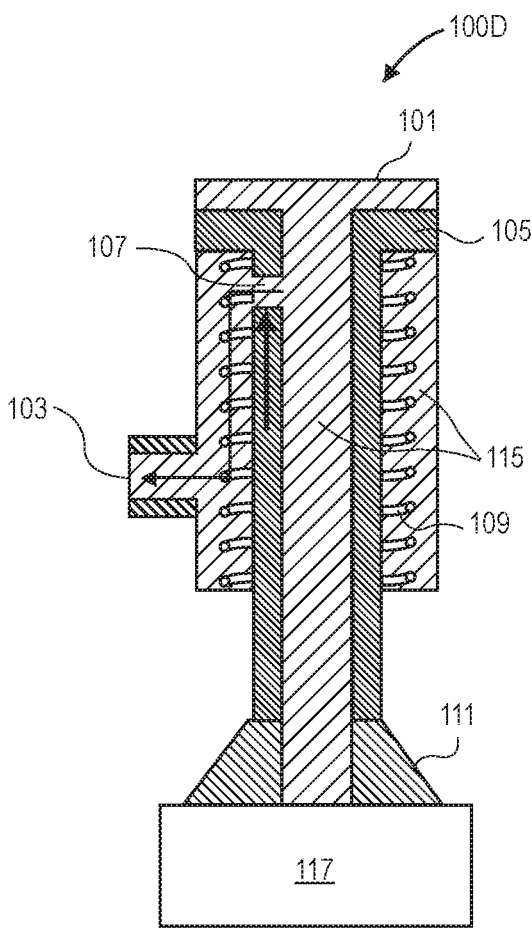
FIG. 1C  FIG. 1D

VACUUM-ACTUATED END OF ARM TOOLS WITH SUCTION CUPS AND EXTENDIBLE PISTONS

BACKGROUND

Many companies may store, package, and ship items and/or groups of items from material handling facilities. For example, many companies may store items in a material handling facility and ship items to various destinations (e.g., customers, stores) from the material handling facility. Various material handling systems and processes often incur significant cost and time. In addition, conventional material handling systems and processes that use suction to grasp objects may include individual pneumatic lines to provide negative pressure to individual suction cups, and separate and distinct pneumatic lines to control pistons or other moving parts using positive pressure, thereby requiring a plurality of complicated pneumatic lines, banks of solenoids, pressure manifolds, negative and positive pressure sources, etc. Accordingly, there is a need for safe, reliable, and efficient automated systems and methods to facilitate the various material handling processes within a material handling facility, thereby improving the speed, reliability, and efficiency of such processes.

BRIEF DESCRIPTION OF THE DRAWINGS

FIGS. 1A-1D are schematic diagrams of an example vacuum-actuated retracting piston for an end of arm tool, in accordance with implementations of the present disclosure.

DETAILED DESCRIPTION

Figure 1A:
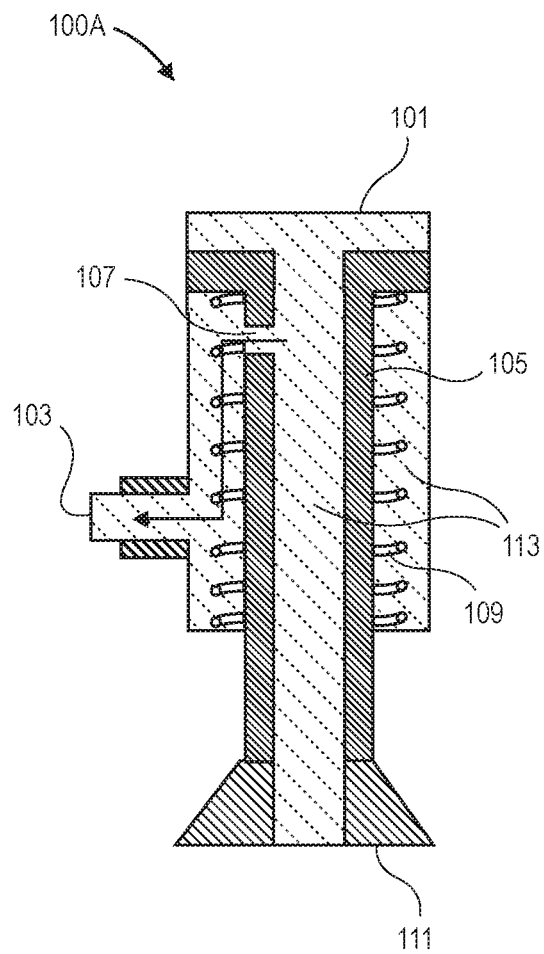

As is set forth in greater detail below, implementations of the present disclosure are directed to systems and methods to grasp objects using vacuum-actuated end of arm tools or end effectors. The vacuum-actuated end of arm tools may include one or more suction cups and/or one or more actuatable pistons, which are actuated using a single vacuum or negative pressure source or line.

In example embodiments, a vacuum-actuated end of arm tool may include a suction cup and a piston, e.g., a vacuum-actuated extending piston. Upon application of vacuum or negative pressure, the piston may move to an extended position responsive to a pressure differential and counter to a spring force that tends to move the piston toward a retracted position. Responsive to contacting, sealing with, and grasping an object via the suction cup, the piston may remain in the extended position responsive to the pressure differential and counter to the spring force.

In this manner, the vacuum-actuated extending piston may utilize a single vacuum or negative pressure source or line to cause grasping of an object by a suction cup, as well as to cause extension and retraction of a piston coupled to the suction cup. In addition, by maintaining the piston in the extended position responsive to grasping an object via the suction cup, the object may be grasped and held at a known position and orientation relative to the end of arm tool. Further, the extended position of the piston may provide some level of compliance responsive to forces applied to the grasped object that may tend to compress the piston.

In other example embodiments, a vacuum-actuated end of arm tool may include one or more suction cups coupled to respective linkage arms, and a piston also coupled to the respective linkage arms, e.g., a vacuum-actuated pinching mechanism. Upon application of vacuum or negative pressure, the piston may move to an extended position responsive to a pressure differential and counter to a spring force that tends to move the piston toward a retracted position. The movement of the piston to the extended position may cause corresponding movement of the respective linkage arms and suction cups to an open position. Responsive to contacting, sealing with, and grasping an object via the one or more suction cups, the piston may move to the retracted position responsive to pressure equalization and the spring force. The movement of the piston to the retracted position may cause corresponding movement of the respective linkage arms and suction cups to a closed position that may tend to pinch, bunch, grab, and/or hold the object that has been grasped by the one or more suction cups.

In this manner, the vacuum-actuated pinching mechanism may utilize a single vacuum or negative pressure source or line to cause grasping of an object by one or more suction cups, as well as to cause extension and retraction of a piston and corresponding opening and closing of respective linkage arms. In addition, by closing the linkage arms upon grasping the object by the suction cups, the object may be more securely grasped and held by the linkage arms of the end of arm tool.

In further example embodiments, a vacuum-actuated end of arm tool may include a central suction cup, and one or more pistons coupled to respective stabilizer arms, e.g., a vacuum-actuated stabilizing mechanism. Upon application of vacuum or negative pressure to the central suction cup, the one or more pistons may remain in retracted positions responsive to a spring force that tends to move the pistons toward the retracted positions. In the retracted positions of the one or more pistons, the stabilizer arms may also correspondingly remain in respective retracted or open positions. Responsive to contacting, sealing with, and grasping an object via the central suction cup, the one or more pistons may move to extended positions responsive to a pressure differential and counter to the spring force. The movement of the one or more pistons to the extended positions may cause corresponding movement of the respective stabilizer arms to respective extended or closed positions that may tend to grab, stabilize, and/or hold the object that has been grasped by the central suction cup.

In this manner, the vacuum-actuated stabilizing mechanism may utilize a single vacuum or negative pressure source or line to cause grasping of an object by a central suction cup, as well as to cause extension and retraction of one or more pistons and corresponding extension and retraction of respective stabilizer arms. In addition, by extending the stabilizer arms upon grasping the object by the central suction cup, the object may be more securely grasped and held by the stabilizer arms of the end of arm tool.

In still further example embodiments, a vacuum-actuated end of arm tool may include a suction cup and a piston, e.g., a passively compliant, extended piston. The piston may generally remain in an extended position due to a spring force applied by a spring to bias the piston toward the extended position. Upon application of vacuum or negative pressure, the piston may remain in the extended position due to the spring force and responsive to a pressure differential that also tends to bias the piston toward the extended position. Responsive to contacting, sealing with, and grasping an object via the suction cup, the piston may further remain in the extended position due to the spring force and responsive to the pressure differential.

In this manner, the passively compliant, extended piston may utilize a single vacuum or negative pressure source or line to cause grasping of an object by a suction cup, as well as to maintain extension of a piston coupled to the suction cup. In addition, by maintaining the piston in the extended position responsive to grasping an object via the suction cup, the object may be grasped and held at a known position and orientation relative to the end of arm tool. Further, the extended position of the piston may provide some level of compliance responsive to forces applied to the grasped object that may tend to compress the piston.

As described in further detail herein, the vacuum-actuated end of arm tools described herein may also be modified or combined in various ways or combinations, which may result in one or more of the operations, functions, benefits, and/or advantages of the various features associated with one or more individual vacuum-actuated end of arm tools described herein.

FIGS. 1A-1D are schematic diagrams 100A, 100B, 100C, 100D of an example vacuum-actuated retracting piston for an end of arm tool, in accordance with implementations of the present disclosure.

As shown in FIGS. 1A-1D, an example vacuum-actuated retracting piston for an end of arm tool may include a cylinder 101 and a piston 105 configured to move within the cylinder 101. For example, the cylinder 101 may have a substantially cylindrical shape with an axis of the cylinder 101 extending substantially vertically within the plane of the diagram of FIG. 1A. In addition, the cylinder 101 may have a first, upper end that is closed to an outside environment, and may have a second, lower end that is open to allow extension and retraction of the piston 105. Further, the cylinder 101 may include a connection 103 to a vacuum or negative pressure source or line, via which negative pressure may be applied to an interior of the cylinder 101. The cylinder 101 may be formed of various materials, such as metals, composites, plastics, other materials, or combinations thereof.

Figure 1B:
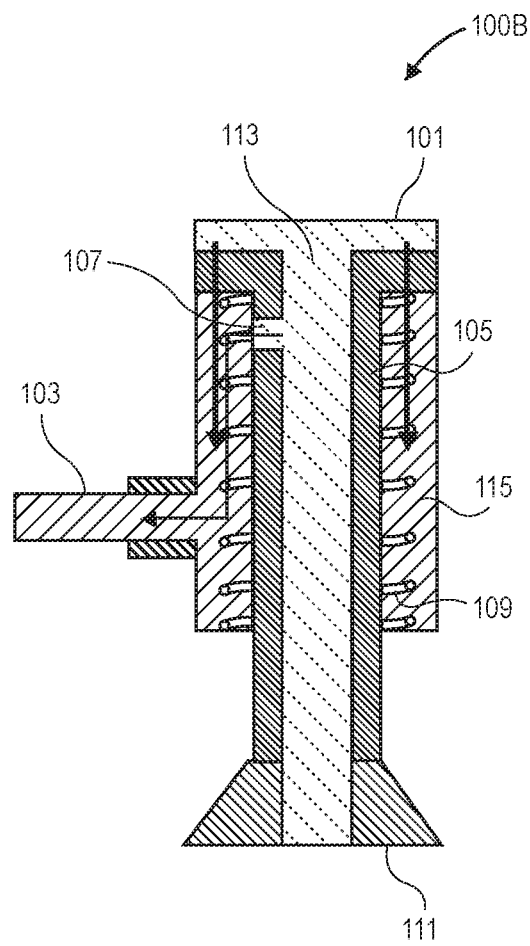

The piston 105 may also have a substantially cylindrical shape corresponding to the substantially cylindrical shape of the cylinder 101, with an axis of the piston 105 also extending substantially vertically within the plane of the diagram of FIG. 1A. For example, the piston 105 may be configured to move between a retracted position, as shown in FIGS. 1A, 1B, and 1D, and an extended position, as shown in FIG. 1C, substantially along the axes of the cylinder 101 and piston 105. In addition, the piston 105 may have a first, upper end that is open to an upper portion of the cylinder 101, and may have a second, lower end that is open to an outside environment. Further, the piston 105 may also include an orifice 107 that permits airflow communication between the connection 103 to the vacuum or negative pressure source or line, the interior of the cylinder 101, and an interior of the piston 105. The piston 105 may be formed of various materials, such as metals, composites, plastics, other materials, or combinations thereof.

In example embodiments, a spring 109 may be positioned within the interior of the cylinder 101. For example, the spring 109 may be positioned between an upper flange, lip, or other portion of the piston 105 and a portion of the cylinder 101 proximate the second, lower end of the cylinder 101. In addition, the spring 109 may apply a spring force to the piston 105 to bias the piston 105 toward the retracted position relative to the cylinder 101, as shown in FIGS. 1A, 1B, and 1D. In some example embodiments, the spring 109 may comprise a compression spring configured to apply a spring force to the piston 105 toward the retracted position. The spring 109 may be formed of various materials, such as metals, composites, plastics, other materials, or combinations thereof.

Furthermore, a suction cup 111 may be coupled to the second, lower end of the piston 105. For example, the suction cup 111 may facilitate grasping of objects using negative pressure applied by the negative pressure source via the connection 103, the interior of the cylinder 101, the orifice 107, and the interior of the piston 105. The suction cup 111 may be formed of various materials, such as rubber, silicone, plastics, composites, metals, other flexible or resilient materials, or combinations thereof.

As shown in FIG. 1A, the example vacuum-actuated retracting piston for an end of arm tool may be in an ambient or initial state in which negative pressure is not being applied to the interior of the cylinder 101 via the connection 103. In the initial state of the example vacuum-actuated retracting piston, the interior of the cylinder 101 and the interior of the piston 105 may have an ambient or initial pressure 113, which may be substantially the same as atmospheric pressure. Because the interior of the cylinder 101 and the interior of the piston 105 may be substantially equalized at ambient or initial pressure 113, the piston 105 may be positioned in the retracted position, as shown in FIG. 1A, due to the spring force applied to the piston 105 by the spring 109.

As shown in FIG. 1B, the example vacuum-actuated retracting piston for an end of arm tool may be in an activated state in which negative pressure is being applied to the interior of the cylinder 101 via the connection 103. In the activated state of the example vacuum-actuated retracting piston, the interior of the cylinder 101 may have a reduced or negative pressure 115 due to the application of negative pressure via the connection 103. In addition, the interior of the piston 105, even with some amount of airflow from the interior of the piston 105 to the interior of the cylinder 101 via the orifice 107, may substantially maintain an ambient or initial pressure 113, which may be substantially the same as or close to atmospheric pressure. As a result, a pressure differential may be generated between the interior of the cylinder 101 proximate the second end of the cylinder, e.g., the reduced or negative pressure 115, and the upper portion of the cylinder 101 proximate the first end of the cylinder that is connected to the interior of the piston 105, e.g., the ambient or initial pressure 113. Because of the pressure differential generated between the interior of the cylinder 101 and the upper portion of the cylinder connected with the interior of the piston 105, a force may be applied to the piston 105 that may tend to move the piston 105 toward the extended position, as indicated by the two downward arrows illustrated in FIG. 1B. In addition, the force applied to the piston 105 based on the pressure differential may be substantially counter to or against the spring force applied to the piston 105 by the spring 109 toward the retracted position. As long as the force, based on the pressure differential, applied to the piston 105 tending to move the piston toward the extended position does not exceed the spring force applied to the piston 105 by the spring 109 toward the retracted position, the example vacuum-actuated retracting piston for an end of arm tool may remain in the retracted position, as shown in FIG. 1B.

As shown in FIG. 1C, the example vacuum-actuated retracting piston for an end of arm tool may be in an extended state in which negative pressure is being applied to the interior of the cylinder 101 via the connection 103, and responsive to the force, based on the pressure differential, applied to the piston 105 tending to move the piston toward the extended position exceeding the spring force applied to the piston 105 by the spring 109 toward the retracted position, the example vacuum-actuated retracting piston for an end of arm tool may move to the extended position, as shown in FIG. 1C. In the extended position of the example vacuum-actuated retracting piston, the interior of the cylinder 101 may have a reduced or negative pressure 115 due to the application of negative pressure via the connection 103. In addition, the interior of the piston 105, even with some amount of airflow from the interior of the piston 105 to the interior of the cylinder 101 via the orifice 107, may substantially maintain an ambient or initial pressure 113, which may be substantially the same as or close to atmospheric pressure. As a result, the pressure differential may be generated between the interior of the cylinder 101 proximate the second end of the cylinder, e.g., the reduced or negative pressure 115, and the upper portion of the cylinder 101 proximate the first end of the cylinder that is connected to the interior of the piston 105, e.g., the ambient or initial pressure 113. Because of the pressure differential generated between the interior of the cylinder 101 and the upper portion of the cylinder connected with the interior of the piston 105, a force may be applied to the piston 105 that may tend to move the piston 105 toward the extended position. In addition, the force applied to the piston 105 based on the pressure differential may be substantially counter to or against the spring force applied to the piston 105 by the spring 109 toward the retracted position.

As shown in FIG. 1D, the example vacuum-actuated retracting piston for an end of arm tool may be in a grasped state in which negative pressure is being applied to the interior of the cylinder 101 via the connection 103, and an object 117 may be grasped via the suction cup 111 using suction, vacuum, or negative pressure. In the grasped state of the example vacuum-actuated retracting piston, the interior of the cylinder 101 may have a reduced or negative pressure 115 due to the application of negative pressure via the connection 103. In addition, due to the airflow communication between the interior of the piston 105 and the interior of the cylinder 101 via the orifice 107, the interior of the piston 105 may also have a reduced or negative pressure 115, which may be substantially the same as or close to the reduced pressure within the interior of the cylinder 101. As a result, responsive to grasping the object 117 via the suction cup 111, a pressure equalization may occur between the interior of the cylinder 101 proximate the second end of the cylinder, e.g., the reduced or negative pressure 115, and the upper portion of the cylinder 101 proximate the first end of the cylinder that is connected to the interior of the piston 105, e.g., substantially the same reduced or negative pressure 115. Because of the pressure equalization between the interior of the cylinder 101 and the upper portion of the cylinder connected with the interior of the piston 105, a force may no longer be applied to the piston 105 that may tend to move the piston 105 toward the extended position. In addition, the spring force applied to the piston 105 by the spring 109 toward the retracted position may tend to move the piston 105 toward the retracted position, as indicated by the upward arrow illustrated in FIG. 1D. Because a force, based on a pressure differential, is no longer applied to the piston 105 tending to move the piston toward the extended position, the example vacuum-actuated retracting piston for an end of arm tool may return to the retracted position due to the spring force applied to the piston 105 by the spring 109 toward the retracted position, as shown in FIG. 1D.

In order to release the grasped object 117, negative pressure may no longer be applied to the interiors of the cylinder 101 and piston 105 via the connection 103 and the orifice 107. In some example embodiments, the negative pressure source or line may instead apply positive pressure to the interiors of the cylinder 101 and piston 105 via the connection 103 and the orifice 107 to remove the vacuum or negative pressure and to generate a substantially ambient or initial pressure within the interiors of the cylinder 101 and piston 105, e.g., at or close to atmospheric pressure. Responsive to stopping the application of negative pressure, the object 117 may be released from the suction cup 111, e.g., to a downstream station or process. In addition, due to the spring force applied by the spring 109 to the piston 105, the piston 105 may remain in the retracted position, as shown in FIG. 1A.

In this manner, the vacuum-actuated retracting piston may utilize a single vacuum or negative pressure source or line to cause grasping of an object by a suction cup, as well as to cause extension and retraction of a piston to which the suction cup is coupled. In addition, upon grasping an object via the suction cup, the piston may return to the retracted position due to pressure equalization between interior portions of the cylinder and piston.

However, depending on the force and/or acceleration with which the piston moves back to the retracted position, the object grasped via the suction cup may become detached or dislodged from the suction cup, such that the object may be inadvertently dropped or released. In addition, the amount of retraction of the piston upon grasping the object may depend upon a weight or other forces applied to the object, as well as the spring force and the applied negative pressure associated with the cylinder and piston. Thus, the piston may only partially retract toward the retracted position upon grasping an object, which may result in a variable or unknown position and orientation of the grasped object relative to the end of arm tool.

Figure 2:
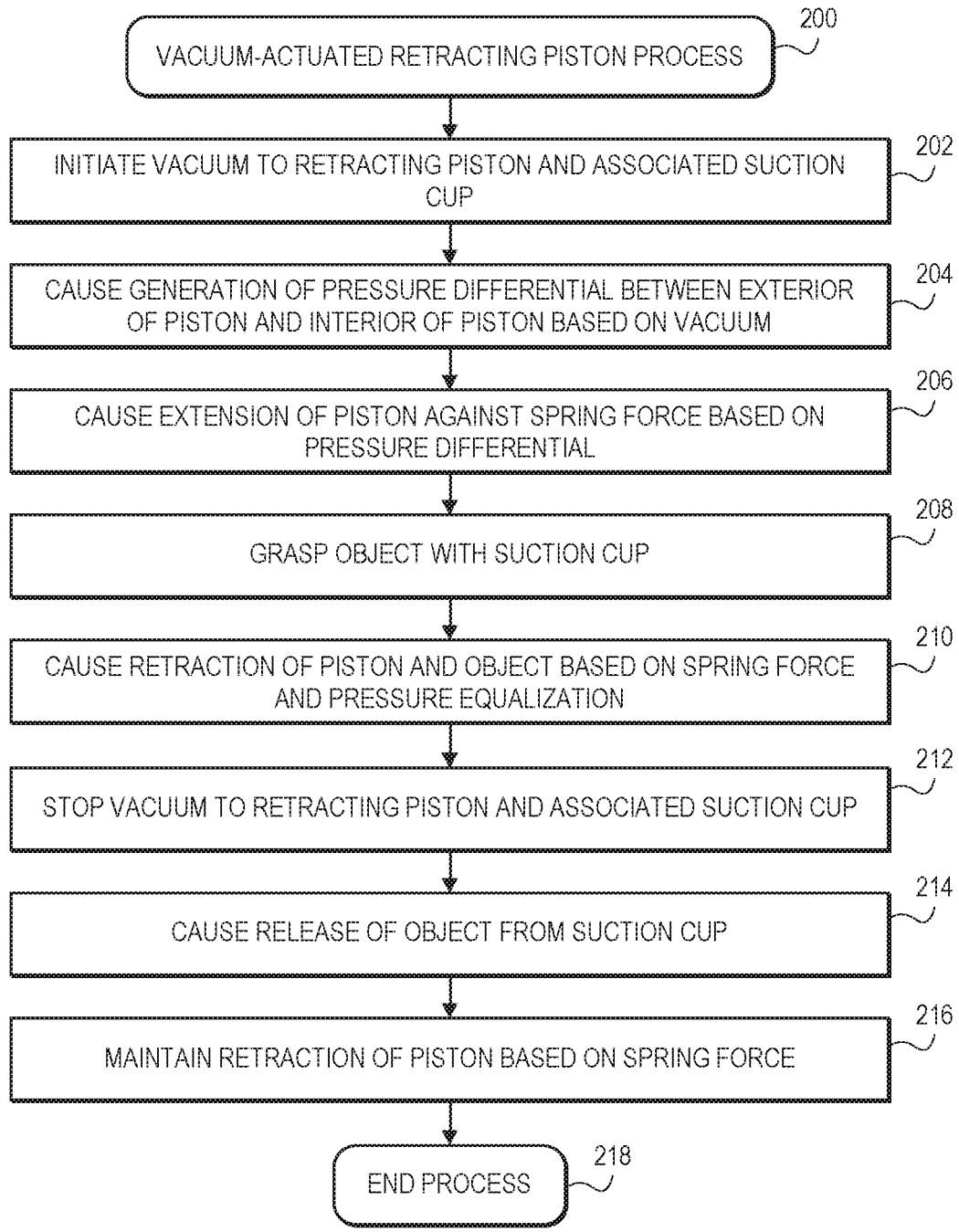
FIG. 2 is a flow diagram illustrating an example vacuum-actuated retracting piston process, in accordance with implementations of the present disclosure.

FIG. 2 is a flow diagram illustrating an example vacuum-actuated retracting piston process 200, in accordance with implementations of the present disclosure.

The process 200 may begin by initiating a vacuum to a retracting piston and associated suction cup, as at 202. For example, a vacuum or negative pressure source or line may apply negative pressure to an interior of a cylinder via a connection. In addition, at least a portion of the negative pressure may also be applied to an interior of a piston and associated suction cup via an orifice of the piston that permits airflow communication between the interior of the cylinder and the interior of the piston. Further, a control system may instruct or command the various processes associated with initiating a vacuum or negative pressure.

The process 200 may continue by causing generation of a pressure differential between an exterior of the piston and an interior of the piston based on the vacuum, as at 204. For example, due to application of the vacuum or negative pressure to the interior of the cylinder, i.e., exterior of the piston, a reduced or negative pressure may be generated within the interior of the cylinder. In addition, because the interior of the piston and associated suction cup may be at least partially open to the outside environment, the interior of the piston that is also connected to an upper portion of the cylinder may remain substantially at an ambient or initial pressure, e.g., substantially the same as or close to atmospheric pressure, even with some amount of airflow from the interior of the piston to the interior of the cylinder via the orifice. Further, a control system may instruct or command the various processes associated with initiating a vacuum or negative pressure to cause generation of a pressure differential.

The process 200 may proceed by causing extension of the piston against a spring force based on the pressure differential, as at 206. For example, the pressure differential between the interior of the cylinder and the interior of the piston may apply a force tending to move the piston from a retracted position to an extended position. In addition, a spring within the interior of the cylinder may apply a spring force tending to move the piston from the extended position to the retracted position. Responsive to the force based on the pressure differential exceeding the spring force applied by the spring, the piston may move from the retracted position to the extended position. Further, a control system may instruct or command the various processes associated with initiating a vacuum or negative pressure to cause extension of a piston.

The process 200 may then continue to grasp an object with the suction cup, as at 208. For example, a robotic arm or other apparatus may move the retracting piston and associated suction cup to a position and orientation such that the suction cup contacts an object. Based on the application of vacuum or negative pressure to the suction cup, the suction cup may contact, seal with, and grasp the object using negative pressure. Further, a control system may instruct or command the various processes associated with grasping an object.

The process 200 may then proceed to cause retraction of the piston and object based on the spring force and pressure equalization, as at 210. For example, responsive to grasping the object with the suction cup, the pressure within the interior of the piston may substantially equalize with the pressure within the interior of the cylinder via the orifice of the piston that permits airflow communication therebetween. In addition, due to the application of vacuum or negative pressure via the connection to the interior of the cylinder, the interiors of the cylinder and piston may substantially equalize to a reduced or negative pressure. Moreover, upon pressure equalization between the interiors of the cylinder and piston, a force based on a pressure differential may no longer be applied to the piston. As a result, the piston may move from the extended position to the retracted position due to the spring force applied to the piston by the spring. Further, a control system may instruct or command the various processes associated with initiating a vacuum or negative pressure to grasp an object and cause retraction of the piston.

The process 200 may then continue with stopping vacuum to the retracting piston and associated suction cup, as at 212. For example, in order to release the grasped object, negative pressure may no longer be applied to the interiors of the cylinder and piston. In some example embodiments, a positive pressure may be applied to the interiors of the cylinder and piston in order to remove the vacuum and generate ambient pressure within the interiors of the cylinder and piston, e.g., at or close to atmospheric pressure. Further, a control system may instruct or command the various processes associated with stopping a vacuum or negative pressure.

The process 200 may proceed with causing release of the object from the suction cup, as at 214. For example, responsive to stopping the application of negative pressure to the interiors of the cylinder and piston, the object may be released from the suction cup. The object may be released to various downstream stations, processes, or locations. Further, a control system may instruct or command the various processes associated with stopping a vacuum or negative pressure to release an object.

The process 200 may then continue by maintaining retraction of the piston based on the spring force, as at 216. For example, responsive to stopping the application of negative pressure to the interiors of the cylinder and piston, and responsive to releasing the object from the suction cup, the piston may remain in the retracted position due to the spring force applied by the spring that tends to bias the piston toward the retracted position. In addition, no pressure differential may be generated between portions of the cylinder and piston in the absence of application of negative pressure. Further, a control system may instruct or command the various processes associated with stopping a vacuum or negative pressure to release an object and maintain retraction of the piston.

The process 200 may then end, as at 218.

FIGS. 3A-3D are schematic diagrams 300A, 300B, 300C, 300D of an example vacuum-actuated extending piston for an end of arm tool, in accordance with implementations of the present disclosure.

As shown in FIGS. 3A-3D, an example vacuum-actuated extending piston for an end of arm tool may include a cylinder 301 and a piston 305 configured to move within the cylinder 301. For example, the cylinder 301 may have a substantially cylindrical shape with an axis of the cylinder 301 extending substantially vertically within the plane of the diagram of FIG. 3A. In addition, the cylinder 301 may have a first, upper end 302 that is open to an outside environment, and may have a second, lower end that is also open to allow extension and retraction of the piston 305. Further, the cylinder 301 may include a connection 303 to a vacuum or negative pressure source or line, via which negative pressure may be applied to an interior of the cylinder 301. The cylinder 301 may be formed of various materials, such as metals, composites, plastics, other materials, or combinations thereof.

Figure 3A:
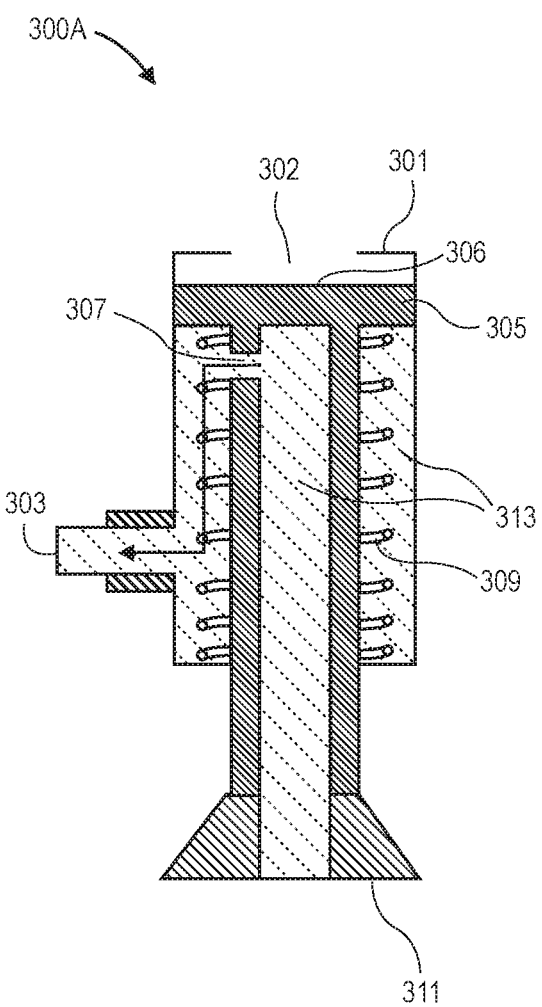
FIGS. 3A-3D are schematic diagrams of an example vacuum-actuated extending piston for an end of arm tool, in accordance with implementations of the present disclosure.
Figure 3B:
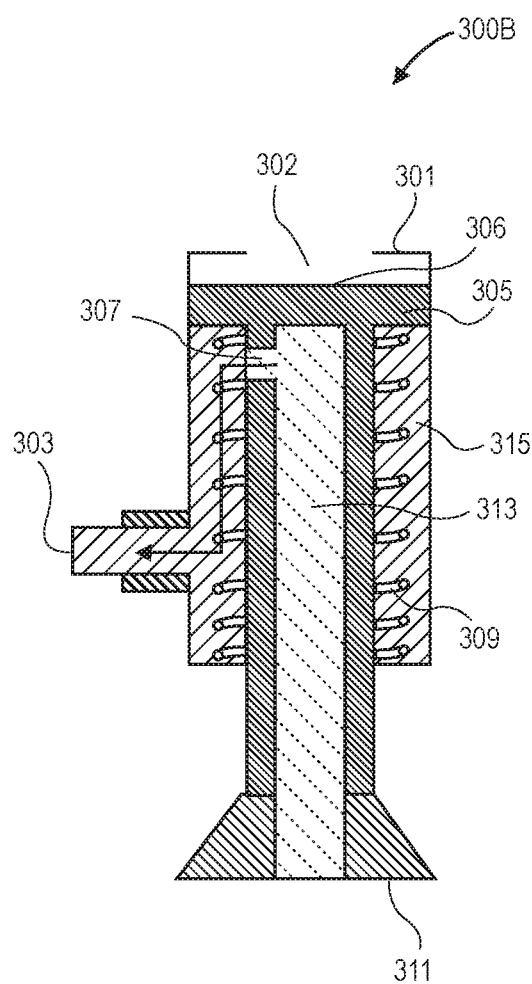
Figures 3C, 3D:
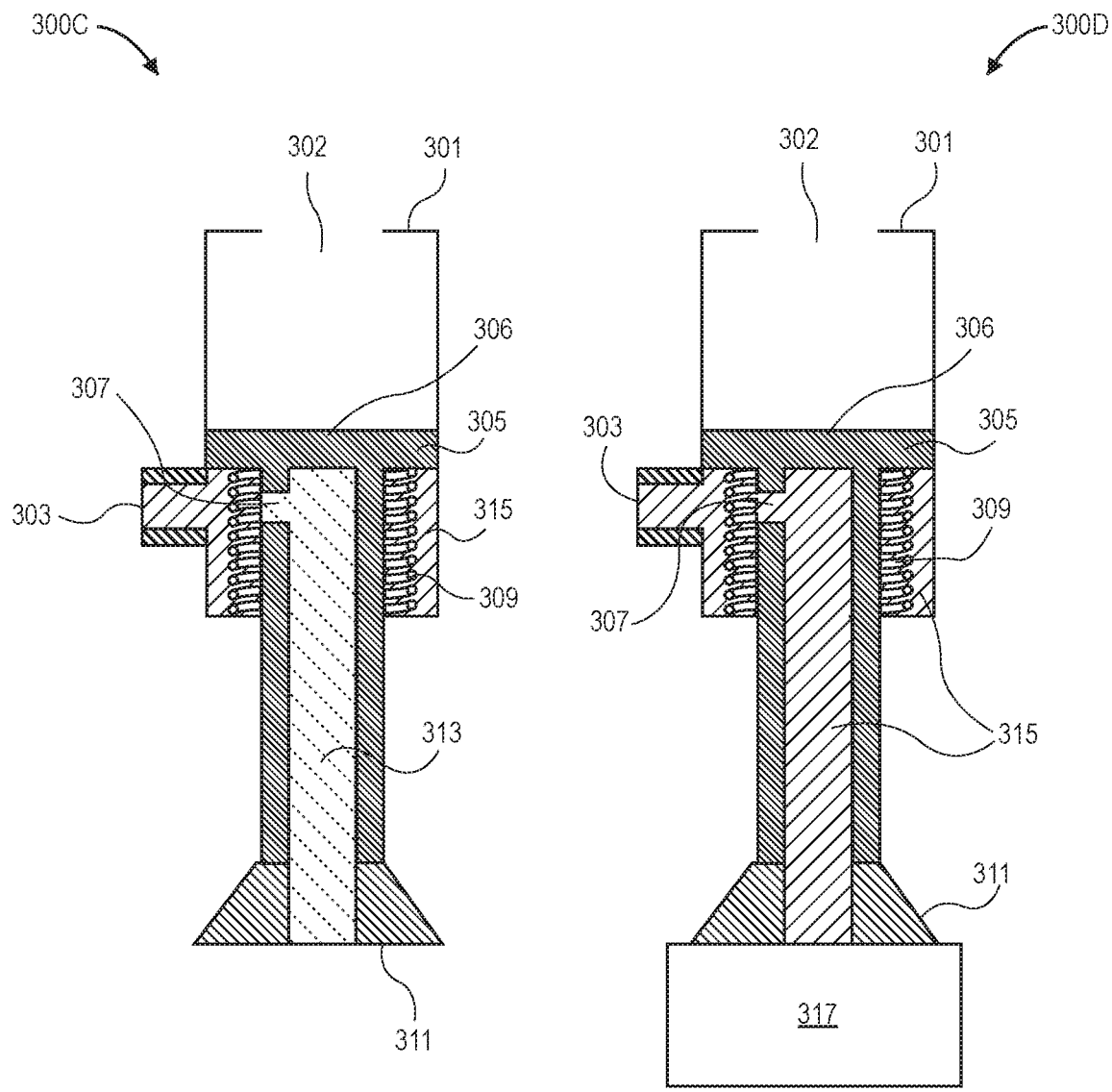

The piston 305 may also have a substantially cylindrical shape corresponding to the substantially cylindrical shape of the cylinder 301, with an axis of the piston 305 also extending substantially vertically within the plane of the diagram of FIG. 3A. For example, the piston 305 may be configured to move between a retracted position, as shown in FIGS. 3A and 3B, and an extended position, as shown in FIGS. 3C and 3D, substantially along the axes of the cylinder 301 and piston 305. In addition, the piston 305 may have a first, upper end 306 that is closed to an upper portion of the cylinder 301 and outside environment, and may have a second, lower end that is open to an outside environment. Further, the piston 305 may also include one or more orifices 307 that permit airflow communication between the connection 303 to the vacuum or negative pressure source or line, the interior of the cylinder 301, and an interior of the piston 305. The piston 305 may be formed of various materials, such as metals, composites, plastics, other materials, or combinations thereof.

In example embodiments, a spring 309 may be positioned within the interior of the cylinder 301. For example, the spring 309 may be positioned between an upper flange, lip, or other portion of the piston 305 and a portion of the cylinder 301 proximate the second, lower end of the cylinder 301. In addition, the spring 309 may apply a spring force to the piston 305 to bias the piston 305 toward the retracted position relative to the cylinder 301, as shown in FIGS. 3A and 3B. In some example embodiments, the spring 309 may comprise a compression spring configured to apply a spring force to the piston 305 toward the retracted position. The spring 309 may be formed of various materials, such as metals, composites, plastics, other materials, or combinations thereof.

Furthermore, a suction cup 311 may be coupled to the second, lower end of the piston 305. For example, the suction cup 311 may facilitate grasping of objects using negative pressure applied by the negative pressure source via the connection 303, the interior of the cylinder 301, the one or more orifices 307, and the interior of the piston 305. The suction cup 311 may be formed of various materials, such as rubber, silicone, plastics, composites, metals, other flexible or resilient materials, or combinations thereof.

As shown in FIG. 3A, the example vacuum-actuated extending piston for an end of arm tool may be in an ambient or initial state in which negative pressure is not being applied to the interior of the cylinder 301 via the connection 303. In the initial state of the example vacuum-actuated extending piston, the interior of the cylinder 301 and the interior of the piston 305 may have an ambient or initial pressure 313, which may be substantially the same as atmospheric pressure. Because the interior of the cylinder 301 and the interior of the piston 305 may be substantially equalized at ambient or initial pressure 313, the piston 305 may be positioned in the retracted position, as shown in FIG. 3A, due to the spring force applied to the piston 305 by the spring 309.

As shown in FIG. 3B, the example vacuum-actuated extending piston for an end of arm tool may be in an activated state in which negative pressure is being applied to the interior of the cylinder 301 via the connection 303. In the activated state of the example vacuum-actuated extending piston, the interior of the cylinder 301 may have a reduced or negative pressure 315 due to the application of negative pressure via the connection 303. In addition, the interior of the piston 305, even with some amount of airflow from the interior of the piston 305 to the interior of the cylinder 301 via the one or more orifices 307, may substantially maintain an ambient or initial pressure 313, which may be substantially the same as or close to atmospheric pressure. As a result, a pressure differential may be generated between the interior of the cylinder 301 proximate the second end of the cylinder, e.g., the reduced or negative pressure 315, and the upper portion of the cylinder 301 that is open to an outside environment, e.g., atmospheric pressure. Because of the pressure differential generated between the interior of the cylinder 301 and the open, upper portion of the cylinder, a force may be applied to the piston 305 that may tend to move the piston 305 toward the extended position, which is shown in FIGS. 3C and 3D. In addition, the force applied to the piston 305 based on the pressure differential may be substantially counter to or against the spring force applied to the piston 305 by the spring 309 toward the retracted position. As long as the force, based on the pressure differential, applied to the piston 305 tending to move the piston toward the extended position does not exceed the spring force applied to the piston 305 by the spring 309 toward the retracted position, the example vacuum-actuated extending piston for an end of arm tool may remain in the retracted position, as shown in FIG. 3B.

As shown in FIG. 3C, the example vacuum-actuated extending piston for an end of arm tool may be in an extended state in which negative pressure is being applied to the interior of the cylinder 301 via the connection 303, and responsive to the force, based on the pressure differential, applied to the piston 305 tending to move the piston toward the extended position exceeding the spring force applied to the piston 305 by the spring 309 toward the retracted position, the example vacuum-actuated extending piston for an end of arm tool may move to the extended position, as shown in FIG. 3C. In the extended position of the example vacuum-actuated extending piston, the interior of the cylinder 301 may have a reduced or negative pressure 315 due to the application of negative pressure via the connection 303. In addition, the interior of the piston 305, even with some amount of airflow from the interior of the piston 305 to the interior of the cylinder 301 via the one or more orifices 307, may substantially maintain an ambient or initial pressure 313, which may be substantially the same as or close to atmospheric pressure. As a result, the pressure differential may be generated between the interior of the cylinder 301 proximate the second end of the cylinder, e.g., the reduced or negative pressure 315, and the open, upper portion of the cylinder 301 proximate the first end of the cylinder, e.g., atmospheric pressure. Because of the pressure differential generated between the interior of the cylinder 301 and the open, upper portion of the cylinder, a force may be applied to the piston 305 that may tend to move the piston 305 toward the extended position. In addition, the force applied to the piston 305 based on the pressure differential may be substantially counter to or against the spring force applied to the piston 305 by the spring 309 toward the retracted position.

As shown in FIG. 3D, the example vacuum-actuated extending piston for an end of arm tool may be in a grasped state in which negative pressure is being applied to the interior of the cylinder 301 via the connection 303, and an object 317 may be grasped via the suction cup 311 using suction, vacuum, or negative pressure. In the grasped state of the example vacuum-actuated extending piston, the interior of the cylinder 301 may have a reduced or negative pressure 315 due to the application of negative pressure via the connection 303. In addition, due to the airflow communication between the interior of the piston 305 and the interior of the cylinder 301 via the one or more orifices 307, the interior of the piston 305 may also have a reduced or negative pressure 315, which may be substantially the same as or close to the reduced pressure within the interior of the cylinder 301. As a result, responsive to grasping the object 317 via the suction cup 311, a pressure equalization may occur between the interior of the cylinder 301 proximate the second end of the cylinder, e.g., the reduced or negative pressure 315, and the interior of the piston 305, e.g., substantially the same reduced or negative pressure 315. Because of the pressure equalization between the interior of the cylinder 301 and the interior of the piston 305 to the reduced or negative pressure 315, the object 317 may be securely grasped by the suction cup 311. In addition, the pressure differential may be maintained between the interior of the cylinder 301 proximate the second end of the cylinder, e.g., the reduced or negative pressure 315, and the open, upper portion of the cylinder 301 proximate the first end of the cylinder, e.g., atmospheric pressure. Because of the pressure differential that is maintained between the interior of the cylinder 301 and the open, upper portion of the cylinder, a force may continue to be applied to the piston 305 that may tend to maintain the piston 305 in the extended position. In addition, the force that may continue to be applied to the piston 305 based on the pressure differential may be substantially counter to or against the spring force applied to the piston 305 by the spring 309 toward the retracted position. Because a force, based on a pressure differential, may continue to be applied to the piston 305 tending to maintain the piston toward the extended position responsive to grasping an object 317 via the suction cup 311, the example vacuum-actuated extending piston for an end of arm tool may remain in the extended position counter to the spring force applied to the piston 305 by the spring 309 toward the retracted position, as shown in FIG. 3D.

In order to release the grasped object 317, negative pressure may no longer be applied to the interiors of the cylinder 301 and piston 305 via the connection 303 and the one or more orifices 307. In some example embodiments, the negative pressure source or line may instead apply positive pressure to the interiors of the cylinder 301 and piston 305 via the connection 303 and the one or more orifices 307 to remove the vacuum or negative pressure and to generate a substantially ambient or initial pressure within the interiors of the cylinder 301 and piston 305, e.g., at or close to atmospheric pressure. Responsive to stopping the application of negative pressure, the object 317 may be released from the suction cup 311, e.g., to a downstream station or process. In addition, responsive to stopping the application of negative pressure, a pressure differential may no longer be generated between the interiors of the cylinder 301 and piston 305 and the open, upper portion of the cylinder 301. As a result, due to the spring force applied by the spring 309 to the piston 305, the piston 305 may move from the extended position to the retracted position, as shown in FIG. 3A.

In this manner, the vacuum-actuated extending piston may utilize a single vacuum or negative pressure source or line to cause grasping of an object by a suction cup, as well as to cause extension and retraction of a piston coupled to the suction cup. In addition, by maintaining the piston in the extended position responsive to grasping an object via the suction cup, the object may be grasped and held at a known position and orientation relative to the end of arm tool. In example embodiments, grasping an object at a known position and orientation relative to the end of arm tool may facilitate subsequent processes or operations, such as moving or manipulating the object in space without interferences or collisions, holding the object in a particular position and orientation relative to another system, device, sensor, or object, placing or transferring the object to a downstream machine, apparatus, or surface, releasing the object to a downstream process, and/or various other processes.

Further, by maintaining the piston in the extended position responsive to grasping an object via the suction cup, accelerations or forces that may tend to detach, dislodge, or cause release of the object from the suction cup due to retraction of the piston may be avoided. Moreover, the extended position of the piston may provide some level of compliance responsive to forces applied to the grasped object that may tend to compress the piston, e.g., due to inadvertent interferences or collisions between the object and another machine, apparatus, system, device, sensor, or object.

In example embodiments, the number, size, diameter, configuration, arrangement, and/or other characteristics of the one or more orifices 307 of the piston 305 may be tuned or modified to adjust or control a suction force used to grasp objects by the suction cup 311 due to application of vacuum or negative pressure. For example, increasing the number, size, diameter, and/or other characteristics of the one or more orifices 307 of the piston 305 may generally increase the suction force applied by the suction cup 311 to grasp objects. Likewise, decreasing the number, size, diameter, and/or other characteristics of the one or more orifices 307 of the piston 305 may generally decrease the suction force applied by the suction cup 311 to grasp objects.

In additional example embodiments, the number, size, diameter, configuration, arrangement, and/or other characteristics of the one or more orifices 307 of the piston 305 may be tuned or modified to adjust or control a pressure differential generated between the interior of the cylinder 301 and the open, upper portion of the cylinder due to application of vacuum or negative pressure. For example, decreasing the number, size, diameter, and/or other characteristics of the one or more orifices 307 of the piston 305 may generally increase the pressure differential between the interior of the cylinder 301 and the open, upper portion of the cylinder. Likewise, increasing the number, size, diameter, and/or other characteristics of the one or more orifices 307 of the piston 305 may generally decrease the pressure differential between the interior of the cylinder 301 and the open, upper portion of the cylinder.

In further example embodiments, the number, size, spring constant, material, coil diameter, and/or other characteristics of the spring 309 within the interior of the cylinder 301 may be tuned or modified to adjust or control a spring force applied by the spring 309 to the piston 305 toward the retracted position. For example, increasing the number, size, spring constant, coil diameter, and/or other characteristics of the spring 309 may generally increase the spring force applied by the spring 309. Likewise, decreasing the number, size, spring constant, coil diameter, and/or other characteristics of the spring 309 may generally decrease the spring force applied by the spring 309. In addition, although the spring 309 is generally described herein as a compression spring within an interior of the cylinder 301, in other example embodiments, the spring 309 may comprise other types of springs, such as tension springs, leaf springs, torsion springs, or other types of springs, and may be positioned or oriented in different manners, as long as the spring 309 applies a spring force to bias the piston 305 toward the retracted position. For example, the spring 309 may alternatively comprise a tension spring positioned between a first, open, upper end 302 of the cylinder 301 and a first, closed, upper end 306 of the piston 305 that applies a spring force to bias the piston 305 toward the retracted position.

In other example embodiments, cylinder dimensions, cylinder volume, piston dimensions, piston volume, piston head area, and/or other characteristics of the cylinder and/or piston may be tuned or modified to adjust or control a suction force used to grasp objects by the suction cup and/or a pressure differential generated between the interior of the cylinder and the open, upper portion of the cylinder due to application of vacuum or negative pressure. For example, a larger piston head area and/or piston volume may generally increase the suction force applied by the suction cup to grasp objects. Likewise, a smaller piston head area and/or piston volume may generally decrease the suction force applied by the suction cup to grasp objects. In addition, a larger cylinder volume may generally increase the pressure differential generated between the interior of the cylinder and the open, upper portion of the cylinder. Likewise, a smaller cylinder volume may generally decrease the pressure differential generated between the interior of the cylinder and the open, upper portion of the cylinder.

Various characteristics of the one or more orifices, the spring, the cylinder, and/or the piston may be modified in various combinations in order to tune or modify generation of pressure differentials, applied spring forces, amounts or levels of passive compliance, piston retraction, piston extension, grasping of objects via suction cups, and/or other aspects of the example end of arm tools described herein.

Figure 4:
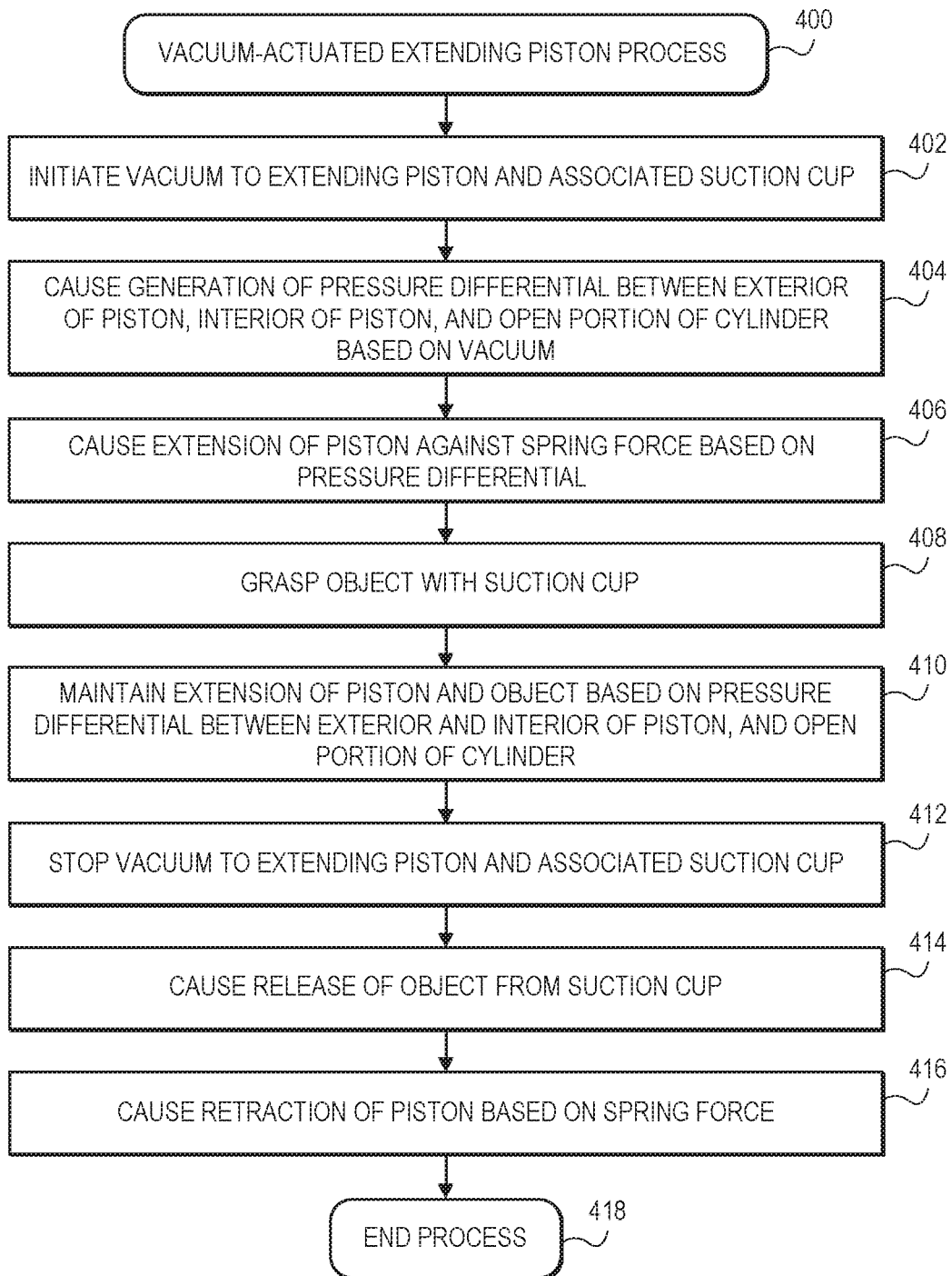
FIG. 4 is a flow diagram illustrating an example vacuum-actuated extending piston process, in accordance with implementations of the present disclosure.

FIG. 4 is a flow diagram illustrating an example vacuum-actuated extending piston process 400, in accordance with implementations of the present disclosure.

The process 400 may begin by initiating a vacuum to an extending piston and associated suction cup, as at 402. For example, a vacuum or negative pressure source or line may apply negative pressure to an interior of a cylinder via a connection. In addition, at least a portion of the negative pressure may also be applied to an interior of a piston and associated suction cup via one or more orifices of the piston that permit airflow communication between the interior of the cylinder and the interior of the piston. Further, a control system may instruct or command the various processes associated with initiating a vacuum or negative pressure.

The process 400 may continue by causing generation of a pressure differential between an exterior of the piston, an interior of the piston, and an open portion of the cylinder based on the vacuum, as at 404. For example, due to application of the vacuum or negative pressure to the interior of the cylinder, i.e., exterior of the piston, a reduced or negative pressure may be generated within the interior of the cylinder. In addition, because an upper portion of the cylinder is open to the outside environment, the open, upper portion of the cylinder may remain substantially at an ambient or initial pressure, e.g., substantially the same as or close to atmospheric pressure. Further, because the interior of the piston and associated suction cup may be at least partially open to the outside environment, the interior of the piston may also remain substantially at an ambient or initial pressure, e.g., substantially the same as or close to atmospheric pressure, even with some amount of airflow from the interior of the piston to the interior of the cylinder via the one or more orifices. Further, a control system may instruct or command the various processes associated with initiating a vacuum or negative pressure to cause generation of a pressure differential.

The process 400 may proceed by causing extension of the piston against a spring force based on the pressure differential, as at 406. For example, the pressure differential between the interior of the cylinder and the open, upper portion of the cylinder may apply a force tending to move the piston from a retracted position to an extended position. In addition, a spring within the interior of the cylinder may apply a spring force tending to move the piston from the extended position to the retracted position. Responsive to the force based on the pressure differential exceeding the spring force applied by the spring, the piston may move from the retracted position to the extended position. Further, a control system may instruct or command the various processes associated with initiating a vacuum or negative pressure to cause extension of a piston.

The process 400 may then continue to grasp an object with the suction cup, as at 408. For example, a robotic arm or other apparatus may move the extending piston and associated suction cup to a position and orientation such that the suction cup contacts an object. Based on the application of vacuum or negative pressure to the suction cup, the suction cup may contact, seal with, and grasp the object using negative pressure. Further, a control system may instruct or command the various processes associated with grasping an object.

The process 400 may then proceed to maintain extension of the piston and object based on the pressure differential between the exterior and interior of the piston, and the open portion of the cylinder, as at 410. For example, responsive to grasping the object with the suction cup, the pressure within the interior of the piston may substantially equalize with the pressure within the interior of the cylinder via the one or more orifices that permit airflow communication therebetween. In addition, due to the application of vacuum or negative pressure via the connection to the interior of the cylinder, the interiors of the cylinder and piston may substantially equalize to a reduced or negative pressure. Moreover, the open, upper portion of the cylinder may remain substantially at an ambient or initial pressure, e.g., substantially the same as or close to atmospheric pressure. Thus, due to the pressure differential between the reduced or negative pressure within the interiors of the cylinder and piston and the ambient or initial pressure of the open, upper portion of the cylinder, a force based on the pressure differential may continue to be applied to the piston. As a result, the piston may remain in the extended position due to the force based on the pressure differential and counter to the spring force applied to the piston by the spring. Further, a control system may instruct or command the various processes associated with initiating a vacuum or negative pressure to grasp an object and maintain extension of the piston.

The process 400 may then continue with stopping vacuum to the extending piston and associated suction cup, as at 412. For example, in order to release the grasped object, negative pressure may no longer be applied to the interiors of the cylinder and piston. In some example embodiments, a positive pressure may be applied to the interiors of the cylinder and piston in order to remove the vacuum and generate ambient pressure within the interiors of the cylinder and piston, e.g., at or close to atmospheric pressure. Further, a control system may instruct or command the various processes associated with stopping a vacuum or negative pressure.

The process 400 may proceed with causing release of the object from the suction cup, as at 414. For example, responsive to stopping the application of negative pressure to the interiors of the cylinder and piston, the object may be released from the suction cup. The object may be released to various downstream stations, processes, or locations. Further, a control system may instruct or command the various processes associated with stopping a vacuum or negative pressure to release an object.

The process 400 may then continue by causing retraction of the piston based on the spring force, as at 416. For example, responsive to stopping the application of negative pressure to the interiors of the cylinder and piston, and responsive to releasing the object from the suction cup, the piston may move from the extended position to the retracted position due to the spring force applied by the spring that tends to bias the piston toward the retracted position. In addition, no pressure differential may be generated between interiors of the cylinder and piston and the open, upper portion of the cylinder in the absence of application of negative pressure. Further, a control system may instruct or command the various processes associated with stopping a vacuum or negative pressure to release an object and cause retraction of the piston.

The process 400 may then end, as at 418.

Figure 5:
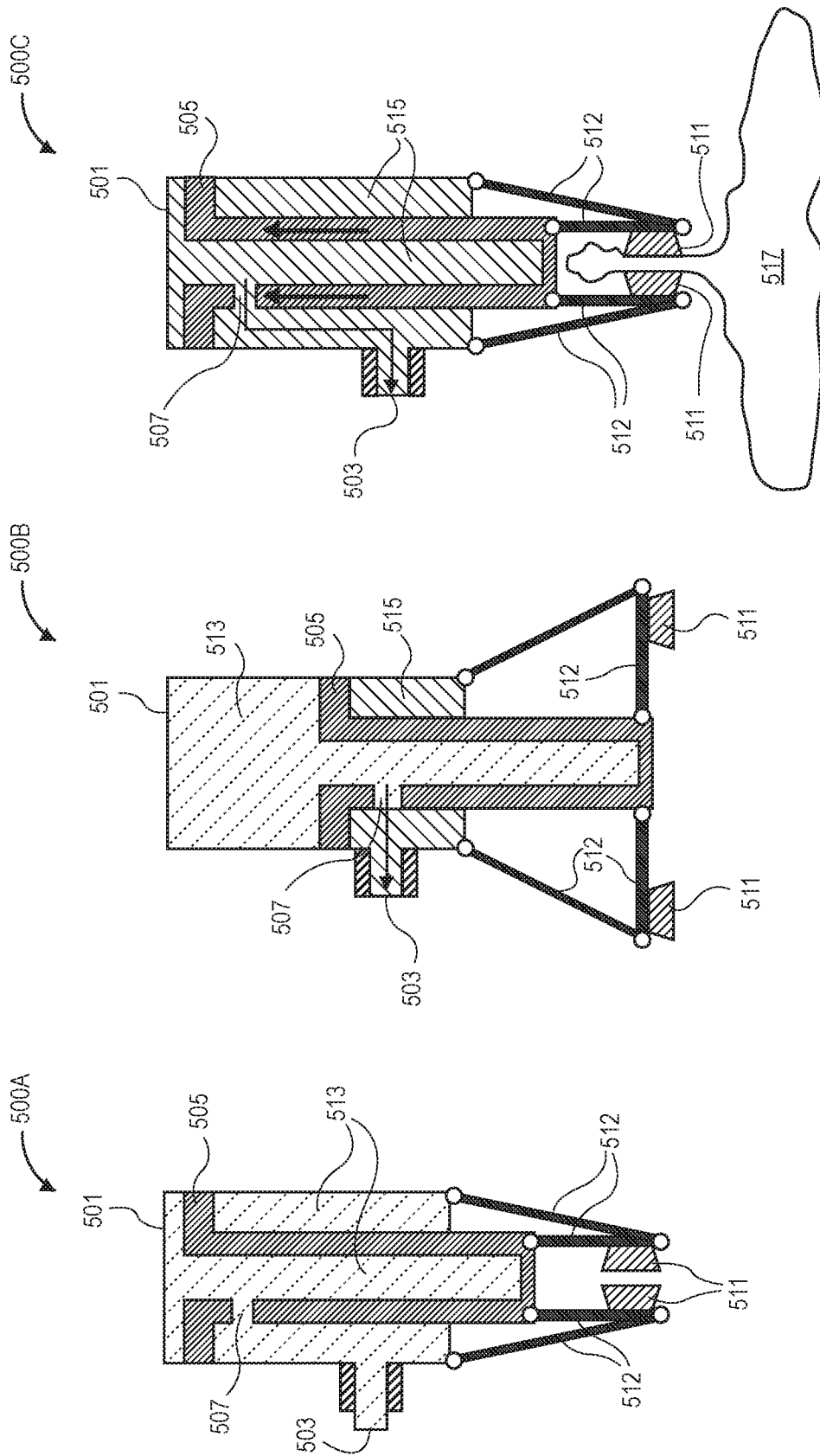
FIGS. 5A-5C are schematic diagrams of an example vacuum-actuated pinching mechanism for an end of arm tool, in accordance with implementations of the present disclosure.

FIGS. 5A-5C are schematic diagrams 500A, 500B, 500C of an example vacuum-actuated pinching mechanism for an end of arm tool, in accordance with implementations of the present disclosure.

As shown in FIGS. 5A-5C, an example vacuum-actuated pinching mechanism for an end of arm tool may include a cylinder 501 and a piston 505 configured to move within the cylinder 501. For example, the cylinder 501 may have a substantially cylindrical shape with an axis of the cylinder 501 extending substantially vertically within the plane of the diagram of FIG. 5A. In addition, the cylinder 501 may have a first, upper end that is closed to an outside environment, and may have a second, lower end that is open to allow extension and retraction of the piston 505. Further, the cylinder 501 may include a connection 503 to a vacuum or negative pressure source or line, via which negative pressure may be applied to an interior of the cylinder 501. The cylinder 501 may be formed of various materials, such as metals, composites, plastics, other materials, or combinations thereof.

The piston 505 may also have a substantially cylindrical shape corresponding to the substantially cylindrical shape of the cylinder 501, with an axis of the piston 505 also extending substantially vertically within the plane of the diagram of FIG. 5A. For example, the piston 505 may be configured to move between a retracted position, as shown in FIGS. 5A and 5C, and an extended position, as shown in FIG. 5B, substantially along the axes of the cylinder 501 and piston 505. In addition, the piston 505 may have a first, upper end that is open to an upper portion of the cylinder 501, and may have a second, lower end that is open to an outside environment via one or more suction cups 511 and linkage arms 512, as further described herein. Further, the piston 505 may also include one or more orifices 507 that permit airflow communication between the connection 503 to the vacuum or negative pressure source or line, the interior of the cylinder 501, and an interior of the piston 505. The piston 505 may be formed of various materials, such as metals, composites, plastics, other materials, or combinations thereof.

In example embodiments, a spring (not shown) may be positioned within the interior of the cylinder 501, which may include any and all of the features described herein with respect to the spring 109 of FIGS. 1A-1D. For example, the spring may be positioned between an upper flange, lip, or other portion of the piston 505 and a portion of the cylinder 501 proximate the second, lower end of the cylinder 501. In addition, the spring may apply a spring force to the piston 505 to bias the piston 505 toward the retracted position relative to the cylinder 501, as shown in FIGS. 5A and 5C. In some example embodiments, the spring may comprise a compression spring configured to apply a spring force to the piston 505 toward the retracted position. The spring may be formed of various materials, such as metals, composites, plastics, other materials, or combinations thereof.

Furthermore, one or more linkage arms 512 may be coupled to the second, lower end of the cylinder 501 and the second, lower end of the piston 505. For example, the one or more linkage arms 512 may include one or more movable joints, such as rotatable joints at a connection to the second, lower end of the cylinder 501, rotatable joints at a connection to the second, lower end of the piston 505, and/or additional rotatable joints at interfaces between portions of the linkage arms 512. The rotatable joints of the linkage arms 512 may comprise hinged joints, ball joints, swiveling joints, gimbaled joints, or other types of rotatable joints. Due to the one or more rotatable joints of the linkage arms 512 that are connected to portions of the cylinder 501 and piston 505, the linkage arms 512 may move between a first, closed, or retracted position, as shown in FIGS. 5A and 5C, and a second, open, or extended position, as shown in FIG. 5B, responsive to movement of the piston 505 between the retracted position and extended position, respectively. In other example embodiments, the movable joints of the linkage arms 512 may comprise other types of joints, such as sliding joints, linear joints, curved or angled joints, twisting joints, or other types of joints that enable movement of the linkage arms 512 between respective closed and open positions. The linkage arms 512 may be formed of various materials, such as metals, composites, plastics, other materials, or combinations thereof.

In addition, one or more suction cups 511 may be coupled to portions of the linkage arms 512 and may move between closed and open positions responsive to movement of the linkage arms 512 between closed and open positions. The suction cups 511 may be in airflow communication with an interior of the piston 505 via tubing, orifices, passageways, or other airflow conduits (not shown). Further, the airflow conduits between the interior of the piston 505 and the suction cups 511 may extend along, be coupled to, or be formed integrally with portions of the linkage arms 512. For example, tubing may extend along portions of the linkage arms 512 between the interior of the piston 505 and the suction cups 511 to permit airflow communication therebetween. Alternatively, airflow passageways may be formed integrally along portions of the linkage arms 512 between the interior of the piston 505 and the suction cups 511 to permit airflow communication therebetween. The one or more suction cups 511 may facilitate grasping of objects using negative pressure applied by the negative pressure source via the connection 503, the interior of the cylinder 501, the one or more orifices 507, the interior of the piston 505, and the airflow conduits associated with the linkage arms 512. The one or more suction cups 511 may be formed of various materials, such as rubber, silicone, plastics, composites, metals, other flexible or resilient materials, or combinations thereof.

As shown in FIG. 5A, the example vacuum-actuated pinching mechanism for an end of arm tool may be in an ambient or initial state in which negative pressure is not being applied to the interior of the cylinder 501 via the connection 503. In the initial state of the example vacuum-actuated pinching mechanism, the interior of the cylinder 501 and the interior of the piston 505 may have an ambient or initial pressure 513, which may be substantially the same as atmospheric pressure. Because the interior of the cylinder 501 and the interior of the piston 505 may be substantially equalized at ambient or initial pressure 513, the piston 505 may be positioned in the retracted position, as shown in FIG. 5A, due to the spring force applied to the piston 505 by the spring.

In addition, based on the piston 505 being in the retracted position, the linkage arms 512 and suction cups 511 may also be positioned in respective closed or retracted positions, as shown in FIG. 5A. In the closed position, the linkage arms 512 may be rotated about various rotatable joints to close or reduce a footprint of the linkage arms 512. Further, in the closed position, the suction cups 511 may be rotated by the linkage arms 512 to positions or orientations that are not intended to initiate grasping of objects via the suction cups 511, e.g., positions or orientations having a similarly closed or reduced footprint.

Referring to FIG. 5B, the example vacuum-actuated pinching mechanism for an end of arm tool may be in an activated state in which negative pressure is being applied to the interior of the cylinder 501 via the connection 503. In the activated state of the example vacuum-actuated pinching mechanism, the interior of the cylinder 501 may have a reduced or negative pressure 515 due to the application of negative pressure via the connection 503. In addition, the interior of the piston 505, even with some amount of airflow from the interior of the piston 505 to the interior of the cylinder 501 via the one or more orifices 507, may substantially maintain an ambient or initial pressure 513, which may be substantially the same as or close to atmospheric pressure. As a result, a pressure differential may be generated between the interior of the cylinder 501 proximate the second end of the cylinder, e.g., the reduced or negative pressure 515, and the upper portion of the cylinder 501 proximate the first end of the cylinder that is connected to the interior of the piston 505, e.g., the ambient or initial pressure 513. Because of the pressure differential generated between the interior of the cylinder 501 and upper portion of the cylinder connected with the interior of the piston 505, a force may be applied to the piston 505 that may tend to move the piston 505 toward the extended position. In addition, the force applied to the piston 505 based on the pressure differential may be substantially counter to or against the spring force applied to the piston 505 by the spring toward the retracted position. As long as the force, based on the pressure differential, applied to the piston 505 tending to move the piston toward the extended position does not exceed the spring force applied to the piston 505 by the spring toward the retracted position, the example vacuum-actuated pinching mechanism for an end of arm tool may remain in the retracted position, similar to that shown in FIG. 5A.

However, responsive to the force, based on the pressure differential, applied to the piston 505 tending to move the piston toward the extended position exceeding the spring force applied to the piston 505 by the spring toward the retracted position, the example vacuum-actuated pinching mechanism for an end of arm tool may move to the extended position, as shown in FIG. 5B. In the extended position of the example vacuum-actuated pinching mechanism, the interior of the cylinder 501 may have a reduced or negative pressure 515 due to the application of negative pressure via the connection 503. In addition, the interior of the piston 505, even with some amount of airflow from the interior of the piston 505 to the interior of the cylinder 501 via the one or more orifices 507, may substantially maintain an ambient or initial pressure 513, which may be substantially the same as or close to atmospheric pressure. As a result, the pressure differential may be generated between the interior of the cylinder 501 proximate the second end of the cylinder, e.g., the reduced or negative pressure 515, and the upper portion of the cylinder 501 proximate the first end of the cylinder that is connected to the interior of the piston 505, e.g., the ambient or initial pressure 513. Because of the pressure differential generated between the interior of the cylinder 501 and upper portion of the cylinder connected with the interior of the piston 505, a force may be applied to the piston 505 that may tend to move the piston 505 toward the extended position. In addition, the force applied to the piston 505 based on the pressure differential may be substantially counter to or against the spring force applied to the piston 505 by the spring toward the retracted position.

In addition, based on the movement of the piston 505 to the extended position, the linkage arms 512 and suction cups 511 may also move to respective corresponding open or extended positions, as shown in FIG. 5B. In the open position, the linkage arms 512 may be rotated about various rotatable joints to open or increase a footprint of the linkage arms 512. In addition, the linkage arms may also extend further away from the second end of the cylinder 501 in the open position. Further, in the open position, the suction cups 511 may be rotated by the linkage arms 512 to positions or orientations intended to initiate grasping of objects via the suction cups 511, e.g., positions or orientations having a similarly open or increased footprint. Moreover, the suction cups 511 may be oriented to generally face away from the second end of the cylinder 501 and may also extend toward one or more objects to be grasped via the suction cups 511.

As shown in FIG. 5C, the example vacuum-actuated pinching mechanism for an end of arm tool may be in a grasped state in which negative pressure is being applied to the interior of the cylinder 501 via the connection 503, and an object 517 may be grasped via the suction cups 511 using suction, vacuum, or negative pressure. In the grasped state of the example vacuum-actuated pinching mechanism, the interior of the cylinder 501 may have a reduced or negative pressure 515 due to the application of negative pressure via the connection 503. In addition, due to the airflow communication between the interior of the piston 505 and the interior of the cylinder 501 via the one or more orifices 507, the interior of the piston 505 may also have a reduced or negative pressure 515, which may be substantially the same as or close to the reduced pressure within the interior of the cylinder 501. As a result, responsive to grasping the object 517 via the suction cups 511, a pressure equalization may occur between the interior of the cylinder 501 proximate the second end of the cylinder, e.g., the reduced or negative pressure 515, and the upper portion of the cylinder 501 proximate the first end of the cylinder that is connected to the interior of the piston 505, e.g., substantially the same reduced or negative pressure 515. Because of the pressure equalization between the interior of the cylinder 501 and upper portion of the cylinder connected with the interior of the piston 505, a force may no longer be applied to the piston 505 that may tend to move the piston 505 toward the extended position. In addition, the spring force applied to the piston 505 by the spring toward the retracted position may tend to move the piston 505 toward the retracted position, as indicated by the upward arrows illustrated in FIG. 5C. Because a force, based on a pressure differential, is no longer applied to the piston 505 tending to move the piston toward the extended position, the example vacuum-actuated pinching mechanism for an end of arm tool may return to the retracted position due to the spring force applied to the piston 505 by the spring toward the retracted position, as shown in FIG. 5C.

In addition, based on the movement of the piston 505 back to the retracted position, the linkage arms 512 and suction cups 511 may also move to respective corresponding closed or retracted positions, as shown in FIG. 5C. In the closed position, the linkage arms 512 may be rotated about various rotatable joints to close or reduce a footprint of the linkage arms 512. In addition, the linkage arms may also close around a portion of the object grasped via the suction cups 511 in order to pinch, bunch, grab, and/or hold the object grasped via the suction cups 511. Further, in the closed position, the suction cups 511 may be rotated by the linkage arms 512 to positions or orientations intended to further secure the grasping of objects via the suction cups 511, e.g., positions or orientations having a similarly closed or reduced footprint. Moreover, the suction cups 511 may be oriented to face toward each other and/or contact each other in order to pinch, bunch, grab, and/or hold the object that has been grasped by the one or more suction cups 511.

In order to release the grasped object 517, negative pressure may no longer be applied to the interiors of the cylinder 501 and piston 505 via the connection 503 and the one or more orifices 507. In some example embodiments, the negative pressure source or line may instead apply positive pressure to the interiors of the cylinder 501 and piston 505 via the connection 503 and the one or more orifices 507 to remove the vacuum or negative pressure and to generate a substantially ambient or initial pressure within the interiors of the cylinder 501 and piston 505, e.g., at or close to atmospheric pressure. Responsive to stopping the application of negative pressure, the object 517 may be released from the suction cups 511, e.g., to a downstream station or process. For example, if the linkage arms 512 and suction cups 511 do not contact each other, the grasped portion of the object 517 may slide, fall, or be released from the linkage arms 512 and suction cups 511, e.g., due to weight of the object 517. In other examples, one or more other robotic arms, systems, machines, equipment, or devices may grasp the object 517 and disconnect or decouple the object 517 from the linkage arms 512 and suction cups 511. In further examples, positive pressure may be applied to the suction cups 511 such that the grasped portion of the object 517 is separated from the linkage arms 512 and suction cups 511, e.g., by blowing or pushing the object 517 away from the suction cups 511. In addition, responsive to stopping the application of negative pressure, a pressure differential may no longer be generated between the interiors of the cylinder 501 and piston 505. As a result, due to the spring force applied by the spring to the piston 505, the piston 505 may remain in the retracted position, as shown in FIG. 5A.

In this manner, the vacuum-actuated pinching mechanism may utilize a single vacuum or negative pressure source or line to cause grasping of an object by one or more suction cups, as well as to cause extension and retraction of a piston and corresponding opening and closing of respective linkage arms and suction cups. In addition, by closing the linkage arms upon grasping the object by the suction cups, the object may be more securely grasped and held by the linkage arms and suction cups of the end of arm tool. For example, such pinching, bunching, or grabbing of portions of objects via the linkage arms and suction cups may enable more secure grasping of various types of objects, e.g., bags, pouches, fabrics, textiles, papers, sheet materials, or other flexible containers, objects, or portions thereof.

In example embodiments, the number, size, diameter, configuration, arrangement, and/or other characteristics of the one or more orifices 507 of the piston 505 may be tuned or modified to adjust or control a suction force used to grasp objects by the suction cups 511 due to application of vacuum or negative pressure. For example, increasing the number, size, diameter, and/or other characteristics of the one or more orifices 507 of the piston 505 may generally increase the suction force applied by the suction cups 511 to grasp objects. Likewise, decreasing the number, size, diameter, and/or other characteristics of the one or more orifices 507 of the piston 505 may generally decrease the suction force applied by the suction cups 511 to grasp objects.

In additional example embodiments, the number, size, spring constant, material, coil diameter, and/or other characteristics of the spring within the interior of the cylinder 501 may be tuned or modified to adjust or control a spring force applied by the spring to the piston 505 toward the retracted position. For example, increasing the number, size, spring constant, coil diameter, and/or other characteristics of the spring may generally increase the spring force applied by the spring. Likewise, decreasing the number, size, spring constant, coil diameter, and/or other characteristics of the spring may generally decrease the spring force applied by the spring. In addition, although the spring is generally described herein as a compression spring within an interior of the cylinder 501, in other example embodiments, the spring may comprise other types of springs, such as tension springs, leaf springs, torsion springs, or other types of springs, and may be positioned or oriented in different manners, as long as the spring applies a spring force to bias the piston 505 toward the retracted position. For example, the spring may alternatively comprise a tension spring positioned between a first, upper end or portion of the cylinder 501 and a first, upper end or portion of the piston 505 that applies a spring force to bias the piston 505 toward the retracted position.

In other example embodiments, cylinder dimensions, cylinder volume, piston dimensions, piston volume, piston head area, and/or other characteristics of the cylinder and/or piston may be tuned or modified to adjust or control a suction force used to grasp objects by the suction cups and/or a pressure differential generated between the interior of the cylinder and the upper portion of the cylinder due to application of vacuum or negative pressure. For example, a larger piston head area and/or piston volume may generally increase the suction force applied by the suction cups to grasp objects. Likewise, a smaller piston head area and/or piston volume may generally decrease the suction force applied by the suction cups to grasp objects. In addition, a larger cylinder volume may generally increase the pressure differential generated between the interior of the cylinder and the upper portion of the cylinder. Likewise, a smaller cylinder volume may generally decrease the pressure differential generated between the interior of the cylinder and the upper portion of the cylinder.

In further example embodiments, various characteristics of the one or more orifices, the spring, the cylinder, and/or the piston may be modified or adjusted to enable extension of the piston and opening of the linkage arms against the spring force, while also enabling retraction of the piston and closing of the linkage arms due to the spring force and counter to the weight of a grasped object. In some examples, if the grasped object is heavy, the spring force may not be sufficient to cause retraction of the piston and corresponding closing of the linkage arms; however, the grasped object may still remain coupled to the end of arm tool via the suction cups, even in the open, or partially open, position of the linkage arms.

In some example embodiments, the example vacuum-actuated pinching mechanism for an end of arm tool may also include a locking mechanism configured to maintain the linkage arms and suction cups in the closed position. For example, the locking mechanism may comprise a pin, latch, clamp, or other structure that may be actuated by a servo, solenoid, or other similar actuator, and the locking mechanism may mechanically secure or limit the rotation of the linkage arms and suction cups in the respective closed positions. Such locking mechanisms may enable the pinching mechanism to maintain the retracted position of the piston and corresponding closed positions of the linkage arms and suction cups responsive to grasping and subsequently lifting heavy objects that may apply a force due to gravity exceeding the spring force that biases the piston to the retracted position.

In still further example embodiments, if the spring force is sufficient to close the linkage arms and suction cups to securely pinch, hold, or grab an object, the application of negative pressure may be stopped or reduced subsequent to moving the linkage arms and suction cups to respective closed positions. Even in the absence of continued negative pressure causing suction at the suction cups to grasp the object, the object may remain coupled to the end of arm tool via the pinching, holding, or grabbing of a portion of the object by the closed linkage arms and suction cups due to the spring force that biases the piston to the retracted position.

Various characteristics of the one or more orifices, the spring, the cylinder, and/or the piston may be modified in various combinations in order to tune or modify generation of pressure differentials, applied spring forces, piston retraction, piston extension, opening of linkage arms and suction cups, closing of linkage arms and suction cups, grasping of objects via suction cups, pinching or bunching of portions of objects, and/or other aspects of the example end of arm tools described herein.

Although FIGS. 5A-5C illustrate a particular number, configuration, or arrangement of cylinder, piston, linkage arms, and suction cups, in other example embodiments, various numbers, configurations, or arrangements of cylinder, piston, linkage arms, and suction cups may be possible. For example, more than two linkage arms may be movably coupled to the cylinder and piston. In addition, a plurality of suction cups may be coupled to one or more linkage arms. Further, the connections or couplings between the linkage arms and the cylinder and piston may be configured or arranged in different manners, and/or the connections or couplings between the suction cups and the linkage arms may also be configured or arranged in different manners. Moreover, a plurality of cylinders and pistons having respective linkage arms and suction cups may be included in a single end of arm tool, such that the plurality of linkage arms and suction cups may cooperatively and/or substantially simultaneously grasp, pinch, and/or hold respective portions of an object, thereby securing the object at a plurality of grasping points.

In alternative example embodiments, the example vacuum-actuated pinching mechanism for an end of arm tool may alternatively comprise a cylinder and piston configured in similar manner to the cylinder and piston described at least with respect to FIGS. 3A-3D. In this alternative, responsive to grasping an object via the suction cups, the piston may remain in the extended position, such that the linkage arms and suction cups also remain in respective open or extended positions. Nonetheless, the closing of the linkage arms and suction cups in respective closed or retracted positions may still result in a closed or reduced footprint of the end of arm tool when in the ambient or initial state, similar to that shown in FIG. 5A.

Figure 6:
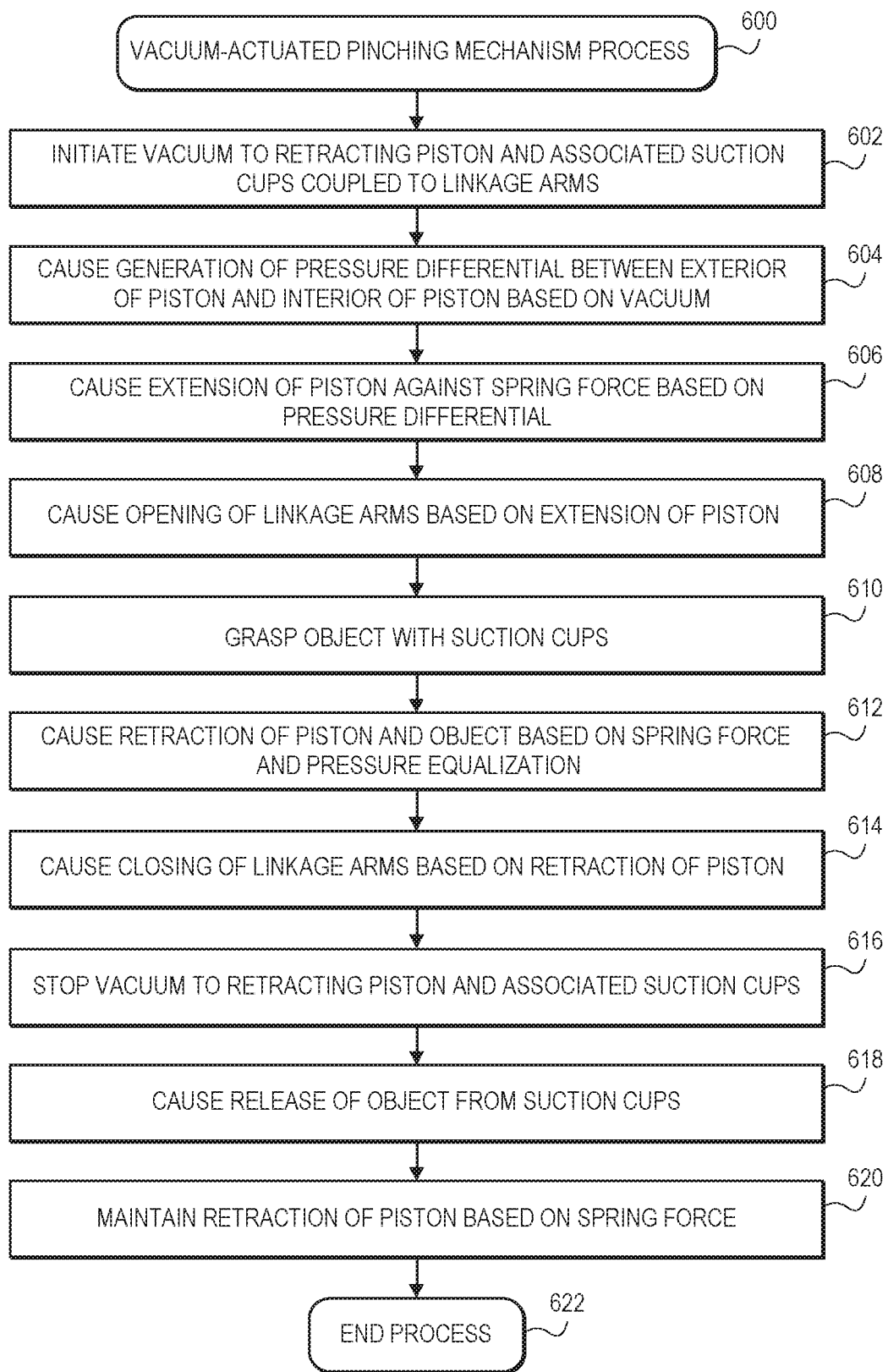
FIG. 6 is a flow diagram illustrating an example vacuum-actuated pinching mechanism process, in accordance with implementations of the present disclosure.

FIG. 6 is a flow diagram illustrating an example vacuum-actuated pinching mechanism process 600, in accordance with implementations of the present disclosure.

The process 600 may begin by initiating a vacuum to a retracting piston and associated suction cups coupled to linkage arms, as at 602. For example, a vacuum or negative pressure source or line may apply negative pressure to an interior of a cylinder via a connection. In addition, at least a portion of the negative pressure may also be applied to an interior of a piston and associated suction cups via one or more orifices of the piston that permit airflow communication between the interior of the cylinder and the interior of the piston, as well as one or more airflow conduits that permit airflow communication between the interior of the piston and the suction cups. Further, a control system may instruct or command the various processes associated with initiating a vacuum or negative pressure.

The process 600 may continue by causing generation of a pressure differential between an exterior of the piston and an interior of the piston based on the vacuum, as at 604. For example, due to application of the vacuum or negative pressure to the interior of the cylinder, i.e., exterior of the piston, a reduced or negative pressure may be generated within the interior of the cylinder. In addition, because the interior of the piston and associated suction cups may be at least partially open to the outside environment, the interior of the piston that is also connected to an upper portion of the cylinder may remain substantially at an ambient or initial pressure, e.g., substantially the same as or close to atmospheric pressure, even with some amount of airflow from the interior of the piston to the interior of the cylinder via the one or more orifices. Further, a control system may instruct or command the various processes associated with initiating a vacuum or negative pressure to cause generation of a pressure differential.

The process 600 may proceed by causing extension of the piston against a spring force based on the pressure differential, as at 606. For example, the pressure differential between the interior of the cylinder and the interior of the piston may apply a force tending to move the piston from a retracted position to an extended position. In addition, a spring within the interior of the cylinder may apply a spring force tending to move the piston from the extended position to the retracted position. Responsive to the force based on the pressure differential exceeding the spring force applied by the spring, the piston may move from the retracted position to the extended position. Further, a control system may instruct or command the various processes associated with initiating a vacuum or negative pressure to cause extension of a piston.

The process 600 may then continue to cause opening of the linkage arms based on the extension of the piston, as at 608. For example, responsive to the movement of the piston from the retracted position to the extended position, the linkage arms may correspondingly move from closed or retracted positions to open or extended positions. Various movable or rotatable joints of the linkage arms may be configured to move and/or rotate responsive to movement of the piston. In the open positions of the linkage arms, the suction cups may also be positioned or oriented in respective open or extended positions intended to initiate grasping of an object via the suction cups. Further, a control system may instruct or command the various processes associated with initiating a vacuum or negative pressure to cause opening of linkage arms.

The process 600 may then proceed to grasp an object with the suction cups, as at 610. For example, a robotic arm or other apparatus may move the retracting piston and associated suction cups coupled to the linkage arms in respective open or extended positions to a position and orientation such that the suction cups contact an object. Based on the application of vacuum or negative pressure to the suction cups, the suction cups may contact, seal with, and grasp the object using negative pressure. Further, a control system may instruct or command the various processes associated with grasping an object.

The process 600 may continue with causing retraction of the piston and object based on the spring force and pressure equalization, as at 612. For example, responsive to grasping the object with the suction cups, the pressure within the interior of the piston may substantially equalize with the pressure within the interior of the cylinder via the one or more orifices that permit airflow communication therebetween. In addition, due to the application of vacuum or negative pressure via the connection to the interior of the cylinder, the interiors of the cylinder and piston may substantially equalize to a reduced or negative pressure. Moreover, upon pressure equalization between the interiors of the cylinder and piston, a force based on a pressure differential may no longer be applied to the piston. As a result, the piston may move from the extended position to the retracted position due to the spring force applied to the piston by the spring. Further, a control system may instruct or command the various processes associated with initiating a vacuum or negative pressure to grasp an object and cause retraction of the piston.

The process 600 may then proceed with causing closing of the linkage arms based on the retraction of the piston, as at 614. For example, responsive to the movement of the piston from the extended position to the retracted position, the linkage arms may correspondingly move from open or extended positions to closed or retracted positions in order to pinch, bunch, grab, and/or hold the object grasped via the suction cups. Various movable or rotatable joints of the linkage arms may be configured to move and/or rotate responsive to movement of the piston. In the closed position of the linkage arms, the suction cups may also be positioned or oriented in respective closed or retracted positions in order to pinch, bunch, grab, and/or hold the object grasped via the suction cups. Further, a control system may instruct or command the various processes associated with initiating a vacuum or negative pressure to grasp an object and cause closing of linkage arms.

The process 600 may then continue by stopping vacuum to the retracting piston and associated suction cups, as at 616. For example, in order to release the grasped object, negative pressure may no longer be applied to the interiors of the cylinder and piston. In some example embodiments, a positive pressure may be applied to the interiors of the cylinder and piston in order to remove the vacuum and generate ambient pressure within the interiors of the cylinder and piston, e.g., at or close to atmospheric pressure. Further, a control system may instruct or command the various processes associated with stopping a vacuum or negative pressure.

The process 600 may proceed by causing release of the object from the suction cups, as at 618. For example, responsive to stopping the application of negative pressure to the interiors of the cylinder and piston, the object may be released from the suction cups. The object may be released using various methods, such as dropping or releasing the object based on a weight of the object, separating the object from the suction cups using another robotic arm, machine, or device, and/or blowing or pushing the object away from the suction cups using positive pressure. The object may be released to various downstream stations, processes, or locations. Further, a control system may instruct or command the various processes associated with stopping a vacuum or negative pressure to release an object.

The process 600 may then continue to maintain retraction of the piston based on the spring force, as at 620. For example, responsive to stopping the application of negative pressure to the interiors of the cylinder and piston, and responsive to releasing the object from the suction cups, the piston may remain in the retracted position due to the spring force applied by the spring that tends to bias the piston toward the retracted position. In addition, no pressure differential may be generated between portions of the cylinder and piston in the absence of application of negative pressure. Further, a control system may instruct or command the various processes associated with stopping a vacuum or negative pressure to release an object and maintain retraction of the piston.

The process 600 may then end, as at 622.

Figure 7:
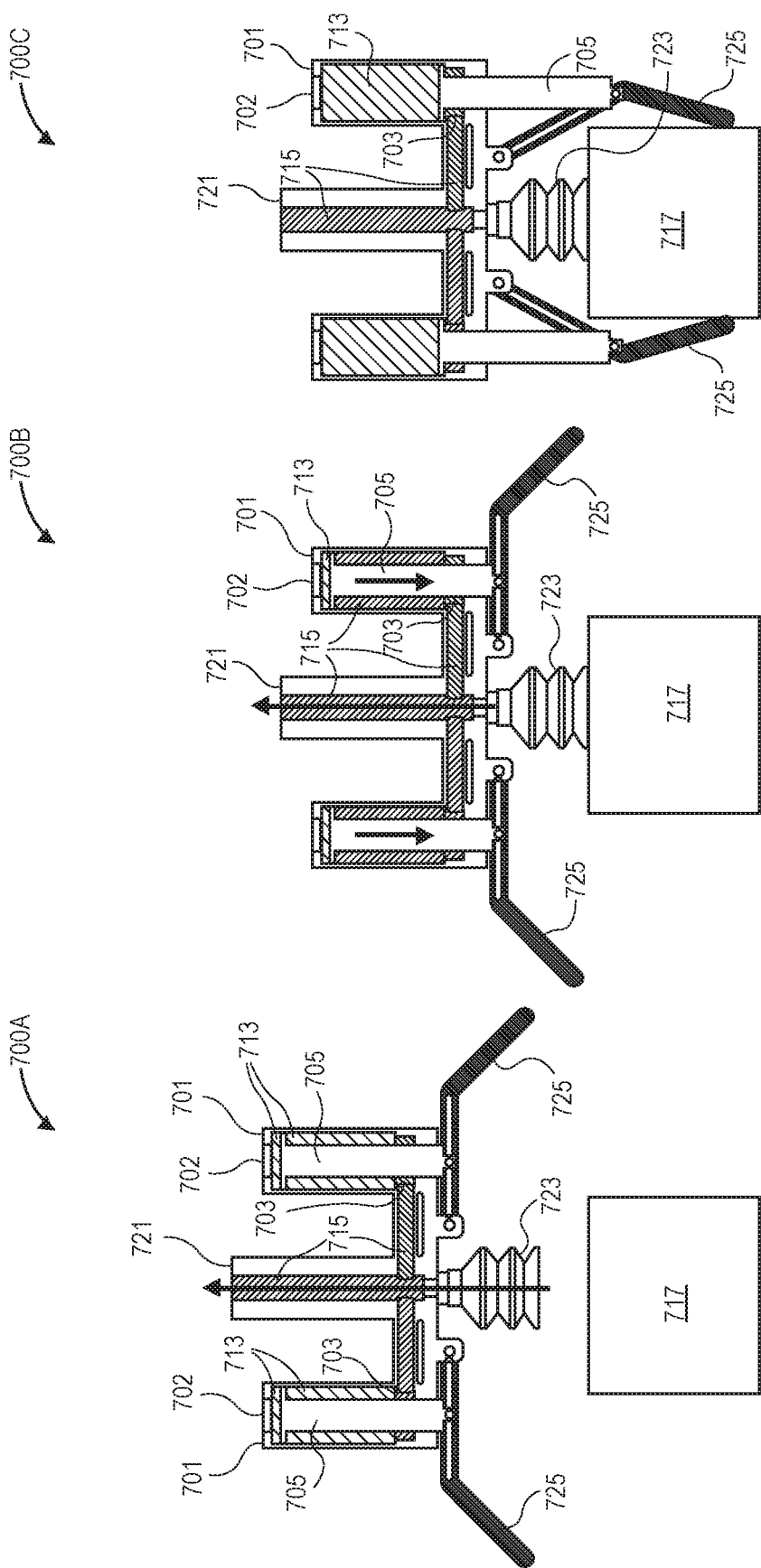
FIGS. 7A-7C are schematic diagrams of an example vacuum-actuated stabilizing mechanism for an end of arm tool, in accordance with implementations of the present disclosure.

FIGS. 7A-7C are schematic diagrams 700A, 700B, 700C of an example vacuum-actuated stabilizing mechanism for an end of arm tool, in accordance with implementations of the present disclosure.

As shown in FIGS. 7A-7C, an example vacuum-actuated stabilizing mechanism for an end of arm tool may include a central cylinder 721 and a central suction cup 723. In addition, the example vacuum-actuated stabilizing mechanism may include one or more cylinders 701 and corresponding pistons 705 configured to move within the cylinders 701. For example, the cylinders 701 may have substantially cylindrical shapes with axes of the cylinders 701 extending substantially vertically within the plane of the diagram of FIG. 7A. In addition, the cylinders 701 may have first, upper ends 702 that are open to an outside environment, and may have second, lower ends that are also open to allow extension and retraction of the pistons 705. Further, the cylinders 701 may include connections 703 to a vacuum or negative pressure source or line via the central cylinder 721, such that negative pressure may be applied to interiors of the cylinders 701. The cylinders 701 may be formed of various materials, such as metals, composites, plastics, other materials, or combinations thereof.

The pistons 705 may also have substantially cylindrical shapes corresponding to the substantially cylindrical shapes of the cylinders 701, with axes of the pistons 705 also extending substantially vertically within the plane of the diagram of FIG. 7A. For example, the pistons 705 may be configured to move between retracted positions, as shown in FIGS. 7A and 7B, and extended positions, as shown in FIG. 7C, substantially along the axes of the cylinders 701 and pistons 705. In addition, the pistons 705 may have first, upper ends that are closed to upper portions of the cylinders 701 and outside environment, and may have second, lower ends that are also closed to an outside environment. In some example embodiments, the pistons 705 may be solid or closed components that do not include any orifices or passageways to permit airflow communication with interiors of the pistons 705. The pistons 705 may be formed of various materials, such as metals, composites, plastics, other materials, or combinations thereof.

In example embodiments, springs (not shown) may be positioned within the interiors of the cylinders 701, which may include any and all of the features described herein with respect to the spring 309 of FIGS. 3A-3D. For example, the springs may be positioned between upper flanges, lips, or other portions of the pistons 705 and portions of the cylinders 701 proximate the second, lower ends of the cylinders 701. In addition, the springs may apply spring forces to the pistons 705 to bias the pistons 705 toward the retracted positions relative to the cylinders 701, as shown in FIGS. 7A and 7B. In some example embodiments, the springs may comprise compression springs configured to apply spring forces to the pistons 705 toward the retracted positions. The springs may be formed of various materials, such as metals, composites, plastics, other materials, or combinations thereof.

In addition, a central suction cup 723 may be coupled to a lower end of the central cylinder 721. For example, the central suction cup 723 may be in airflow communication with an interior of the central cylinder 721, and a vacuum or negative pressure may be applied by a negative pressure source or line to the central cylinder 721. The central suction cup 723 may facilitate grasping of objects using negative pressure applied by the negative pressure source via the central cylinder 721. The central suction cup 723 may be formed of various materials, such as rubber, silicone, plastics, composites, metals, other flexible or resilient materials, or combinations thereof.

Furthermore, one or more stabilizer arms 725 may be movably coupled to portions of the end of arm tool and the second, lower ends of the pistons 705. For example, the one or more stabilizer arms 725 may include one or more movable joints, such as rotatable joints at a connection to static portions of the end of arm tool, and/or sliding joints at a connection to the second, lower ends of the pistons 705. The rotatable joints of the stabilizer arms 725 may comprise hinged joints, ball joints, swiveling joints, gimbaled joints, or other types of rotatable joints. In addition, the sliding joints of the stabilizer arms 725 may comprise pin and slot joints, gliding joints, rolling joints, toothed or geared joints, or other types of sliding or linear joints. Due to the one or more movable joints of the stabilizer arms 725 to portions of the end of arm tool and second, lower ends of the pistons 705, the stabilizer arms 725 may move between first retracted or open positions, as shown in FIGS. 7A and 7B, and second extended or closed positions, as shown in FIG. 7C, responsive to movement of the pistons 705 between the retracted positions and extended positions, respectively. In other example embodiments, the movable joints of the stabilizer arms 725 may comprise other types of joints, such as sliding joints, linear joints, curved or angled joints, twisting joints, rotatable joints, or other types of joints that enable movement of the stabilizer arms 725 between respective open and closed positions. The stabilizer arms 725 may be formed of various materials, such as metals, composites, plastics, other materials, or combinations thereof.

As shown in FIG. 7A, the example vacuum-actuated stabilizing mechanism for an end of arm tool may be in an activated state in which negative pressure is being applied to the interior of the central cylinder 721 by a negative pressure source or line. In the activated state of the example vacuum-actuated stabilizing mechanism, the interior of the central cylinder 721 may have a reduced or negative pressure 715 due to the application of negative pressure. In addition, the central suction cup 723, which is open to an outside environment, may also have an at least partially reduced or negative pressure 715 due to the application of negative pressure via the central cylinder 721. Further, due to the airflow communication between the central cylinder 721 and the central suction cup 723 that is open to an outside environment, the interiors of the cylinders 701, even with a small amount of airflow from the interiors of the cylinders 701 to the interior of the central cylinder 721 via the connections 703, may substantially maintain an ambient or initial pressure 713, which may be substantially the same as or close to atmospheric pressure. In addition, because the upper portions of the cylinders 701 are also open to an outside environment via open first, upper ends 702 of the cylinders 701, the upper portions of the cylinders 701 may also substantially maintain an ambient or initial pressure 713, which may be substantially the same as or close to atmospheric pressure. As a result, pressure differentials may not be generated between the interiors of the cylinders 701, e.g., substantially atmospheric pressure, and the upper portions of the cylinders 701 that are open to an outside environment, e.g., atmospheric pressure. Thus, the pistons 705 may remain in the retracted positions due to the spring forces applied to the pistons 705 by the springs toward the retracted positions, as shown in FIG. 7A.

In addition, based on the pistons 705 being in the retracted positions, the stabilizer arms 725 may also be positioned in respective retracted or open positions, as shown in FIG. 7A. In the open positions, the stabilizer arms 725 may be moved and/or rotated about various movable joints to open or raise the stabilizer arms 725. Further, in the open positions, the stabilizer arms 725 may be moved and/or rotated to positions or orientations to avoid, remove, or prevent contact with an object 717 to be grasped.

As shown in FIG. 7B, the example vacuum-actuated stabilizing mechanism for an end of arm tool may be in an initial grasped state in which negative pressure is being applied to the interior of the central cylinder 721 and central suction cup 723, and in which an object 717 is initially grasped by the central suction cup 723 via negative pressure. In the initial grasped state of the example vacuum-actuated stabilizing mechanism, the interior of the central cylinder 721 may have a reduced or negative pressure 715 due to the application of negative pressure. In addition, the central suction cup 723, which has initially grasped the object 717, may also have a reduced or negative pressure 715 due to the application of negative pressure via the central cylinder 721 and sealing of the central suction cup 723 by the grasped object 717. Further, due to the airflow communication between the central cylinder 721 and the interiors of the cylinders 701 via the connections 703, the interiors of the cylinders 701 may also have a reduced or negative pressure 715. In addition, because the upper portions of the cylinders 701 are open to an outside environment via open first, upper ends 702 of the cylinders 701, the upper portions of the cylinders 701 may substantially maintain an ambient or initial pressure 713, which may be substantially the same as or close to atmospheric pressure. As a result, pressure differentials may be generated between the interiors of the cylinders 701 proximate the second ends of the cylinders, e.g., the reduced or negative pressure 715, and the upper portions of the cylinders 701 that are open to an outside environment, e.g., atmospheric pressure. Because of the pressure differentials generated between the interiors of the cylinders 701 and the open, upper portions of the cylinders 701, forces may be applied to the pistons 705 that may tend to move the pistons 705 toward the extended positions, as indicated by the downward arrows illustrated in FIG. 7B. In addition, the forces applied to the pistons 705 based on the pressure differentials may be substantially counter to or against the spring forces applied to the pistons 705 by the springs toward the retracted positions. As long as the forces, based on the pressure differentials, applied to the pistons 705 tending to move the pistons toward the extended positions do not exceed the spring forces applied to the pistons 705 by the springs toward the retracted positions, the pistons 705 of the example vacuum-actuated stabilizing mechanism for an end of arm tool may remain in the retracted positions, as shown in FIG. 7B.

In addition, based on the pistons 705 remaining in the retracted positions, the stabilizer arms 725 may also be maintained in respective retracted or open positions, as shown in FIG. 7B. In the open positions, the stabilizer arms 725 may be moved and/or rotated about various movable joints to open or raise the stabilizer arms 725. Further, in the open positions, the stabilizer arms 725 may be moved and/or rotated to positions or orientations to avoid, remove, or prevent contact with an object 717 initially grasped by the central suction cup 723.

As shown in FIG. 7C, the example vacuum-actuated stabilizing mechanism for an end of arm tool may be in a stabilized state in which negative pressure is being applied to the interior of the central cylinder 721 and central suction cup 723, and in which an object 717 is grasped by the central suction cup 723 via negative pressure. In the stabilized state of the example vacuum-actuated stabilizing mechanism, the interior of the central cylinder 721 may have a reduced or negative pressure 715 due to the application of negative pressure. In addition, the central suction cup 723, which has grasped the object 717, may also have a reduced or negative pressure 715 due to the application of negative pressure via the central cylinder 721 and sealing of the central suction cup 723 by the grasped object 717. Further, due to the airflow communication between the central cylinder 721 and the interiors of the cylinders 701 via the connections 703, the interiors of the cylinders 701 may also have a reduced or negative pressure 715. In addition, because the upper portions of the cylinders 701 are open to an outside environment via open first, upper ends 702 of the cylinders 701, the upper portions of the cylinders 701 may substantially maintain an ambient or initial pressure 713, which may be substantially the same as or close to atmospheric pressure. As a result, pressure differentials may be generated between the interiors of the cylinders 701 proximate the second ends of the cylinders, e.g., the reduced or negative pressure 715, and the upper portions of the cylinders 701 that are open to an outside environment, e.g., atmospheric pressure. Because of the pressure differentials generated between the interiors of the cylinders 701 and the open, upper portions of the cylinders 701, forces may be applied to the pistons 705 that may tend to move the pistons 705 toward the extended positions, as shown in FIG. 7C. In addition, the forces applied to the pistons 705 based on the pressure differentials may be substantially counter to or against the spring forces applied to the pistons 705 by the springs toward the retracted positions. Responsive to the forces, based on the pressure differentials, applied to the pistons 705 tending to move the pistons toward the extended positions exceeding the spring forces applied to the pistons 705 by the springs toward the retracted positions, the pistons 705 of the example vacuum-actuated stabilizing mechanism for an end of arm tool may move to the extended positions, as shown in FIG. 7C.

In addition, based on the movement of the pistons 705 to the extended positions, the stabilizer arms 725 may also move to respective corresponding extended or closed positions, as shown in FIG. 7C. In the closed positions, the stabilizer arms 725 may be moved and/or rotated about various movable joints to close or lower the stabilizer arms 725. Further, in the closed positions, the stabilizer arms 725 may be moved and/or rotated to positions or orientations around a portion of the object 717 in order to grab, stabilize, and/or hold the object that may be initially grasped by the central suction cup 723. Moreover, the stabilizer arms 725 may be oriented to close toward and/or contact each other in order to grab, stabilize, and/or hold the object 717 that has been grasped by the central suction cup 723.

In order to release the grasped object 717, negative pressure may no longer be applied to the interiors of the cylinders 701 via the connections 703 to the central cylinder 721. In some example embodiments, the negative pressure source or line may instead apply positive pressure to the interiors of the cylinders 701 via the connections 703 to the central cylinder 721 to remove the vacuum or negative pressure and to generate a substantially ambient or initial pressure within the interiors of the cylinders 701, e.g., at or close to atmospheric pressure. Responsive to stopping the application of negative pressure, the object 717 may be released from the central suction cup 723, e.g., to a downstream station or process. In addition, responsive to stopping the application of negative pressure, a pressure differential may no longer be generated between the interiors of the cylinders 701 and the open, upper portions of the cylinders 701. As a result, due to the spring forces applied by the springs to the pistons 705, the pistons 705 may move from the extended positions to the retracted positions. Further, based on the movements of the pistons 705 to the retracted positions, the stabilizer arms 725 may also move to respective corresponding retracted or open positions, as shown in FIG. 7A.

In this manner, the vacuum-actuated stabilizing mechanism may utilize a single vacuum or negative pressure source or line to cause grasping of an object by a central suction cup, as well as to cause extension and retraction of one or more pistons and corresponding extension and retraction of respective stabilizer arms. In addition, by extending the stabilizer arms upon grasping the object by the central suction cup, the object may be more securely grasped and held by the stabilizer arms of the end of arm tool. For example, the stabilizer arms may prevent rotation, rocking, swinging, or other types of movement of the object grasped by the central suction cup during movement of the end of arm tool, e.g., by a robotic arm, and may thereby prevent inadvertent release of the object from the central suction cup responsive to forces and/or accelerations during movement or transfer.

In example embodiments, the number, size, diameter, configuration, arrangement, and/or other characteristics of the connections 703 between the cylinders 701 and central cylinder 721 may be tuned or modified to adjust or control generation of pressure differentials that apply forces to move the pistons 705 toward extended positions due to application of vacuum or negative pressure. For example, increasing the number, size, diameter, and/or other characteristics of the connections 703 may generally increase or accelerate the generation of the pressure differentials that apply forces to move the pistons 705. Likewise, decreasing the number, size, diameter, and/or other characteristics of the connections 703 may generally decrease or decelerate the generation of the pressure differentials that apply forces to move the pistons 705.

In additional example embodiments, the number, size, spring constant, material, coil diameter, and/or other characteristics of the springs within the interiors of the cylinders 701 may be tuned or modified to adjust or control spring forces applied by the springs to the pistons 705 toward the retracted positions. For example, increasing the number, size, spring constant, coil diameter, and/or other characteristics of the springs may generally increase the spring forces applied by the springs. Likewise, decreasing the number, size, spring constant, coil diameter, and/or other characteristics of the springs may generally decrease the spring forces applied by the springs.

In other example embodiments, cylinder dimensions, cylinder volumes, piston dimensions, piston volumes, piston head areas, and/or other characteristics of the central cylinder, cylinders, and/or pistons may be tuned or modified to adjust or control a suction force used to grasp objects by the central suction cup and/or pressure differentials generated between the interiors of the cylinders and the upper portions of the cylinders due to application of vacuum or negative pressure. For example, larger cylinder volumes may generally increase the pressure differentials generated between the interiors of the cylinders and the upper portions of the cylinders. Likewise, smaller cylinder volumes may generally decrease the pressure differentials generated between the interiors of the cylinders and the upper portions of the cylinders.

In further example embodiments, various characteristics of the one or more connections, the springs, the central cylinder, the cylinders, and/or the pistons may be modified or adjusted to enable extension of the stabilizer arms against the spring forces, as well as to enable sufficient grabbing, stabilizing, or holding of the grasped object by the stabilizer arms counter to external forces, such as the weight of a grasped object and/or forces due to movements or rotations of the grasped object. In some examples, if the grasped object is too large, the stabilizer arms may not be able to extend or close around the object, or if the grasped object is too small, the stabilizer arms may not contact, hold, or stabilize the object even in the extended or closed positions; however, the grasped object may still remain coupled to the end of arm tool via the central suction cup, even in the open, or partially open, positions of the stabilizer arms or in the closed, but non-contacting, positions of the stabilizer arms.

In some example embodiments, the example vacuum-actuated stabilizing mechanism for an end of arm tool may also include a locking mechanism configured to maintain the stabilizer arms in the extended or closed positions. For example, the locking mechanism may comprise a pin, latch, clamp, or other structure that may be actuated by a servo, solenoid, or other similar actuator, and the locking mechanism may mechanically secure or limit the movement of the stabilizer arms in the respective closed positions. Such locking mechanisms may enable the stabilizing mechanism to maintain the extended positions of the pistons and corresponding closed positions of the stabilizer arms responsive to grasping and subsequently lifting heavy objects that may apply a force due to gravity exceeding the suction force of the central suction cup.

In still further example embodiments, if a locking mechanism is included that may maintain the stabilizer arms in extended or closed positions to securely grab, stabilize, or hold an object, the application of negative pressure may be stopped or reduced subsequent to moving the stabilizer arms to respective closed positions. Even in the absence of continued negative pressure causing suction at the central suction cup to grasp the object, the object may remain coupled to the end of arm tool via the grabbing, stabilizing, and/or holding of a portion of the object by the stabilizer arms that may be locked in the closed positions.

Various characteristics of the one or more connections, the springs, the central cylinder, the cylinders, and/or the pistons may be modified in various combinations in order to tune or modify generation of pressure differentials, applied spring forces, piston retraction, piston extension, opening or retracting of stabilizer arms, closing or extending of stabilizer arms, grasping of objects via suction cups, grabbing or stabilizing of portions of objects via stabilizer arms, and/or other aspects of the example end of arm tools described herein.

Although FIGS. 7A-7C illustrate a particular number, configuration, or arrangement of a central cylinder, central suction cup, cylinders, pistons, and stabilizer arms, in other example embodiments, various numbers, configurations, or arrangements of a central cylinder, central suction cup, cylinders, pistons, and stabilizer arms may be possible. For example, a plurality of stabilizer arms may be movably coupled to a single, corresponding cylinder and piston. In addition, more than two stabilizer arms that are coupled to respective cylinders and pistons may be included. Further, a plurality of central suction cups may be included to grasp the object. Moreover, the stabilizer arms may have various different shapes, sizes, dimensions, or configurations. Furthermore, the connections or couplings between the stabilizer arms and the respective cylinders and pistons may be configured or arranged in different manners.

In alternative example embodiments, the example vacuum-actuated stabilizing mechanism for an end of arm tool may alternatively comprise a central cylinder and central suction cup that are configured in similar manner to the cylinder and retracting piston described at least with respect to FIGS. 1A-1D, or configured in similar manner to the cylinder and extending piston described at least with respect to FIGS. 3A-3D. In this alternative, the central suction cup may be coupled to a lower end of the piston within the central cylinder, and the central suction cup may move between retracted and extended positions responsive to movement of the piston between retracted and extended positions, respectively. In the alternative with a central cylinder and retracting piston, the piston may retract upon grasping the object via the central suction cup. In the alternative with a central cylinder and extending piston, the piston may remain extended upon grasping the object via the central suction cup. Further, the remaining cylinders and pistons that are coupled to stabilizer arms may move to respective extended or closed positions responsive to grasping and sealing of the object to the central suction cup.

In additional alternative example embodiments, the example vacuum-actuated stabilizing mechanism for an end of arm tool may alternatively comprise cylinders and pistons coupled to stabilizer arms that are configured in similar manner to the cylinder and extending piston described at least with respect to FIGS. 3A-3D. In this alternative, one or more suction cups may also be coupled to respective stabilizer arms, and such suction cups may be in airflow communication with interiors of the respective pistons via airflow conduits associated with the stabilizer arms, similar to airflow conduits associated with linkage arms as described at least with respect to FIGS. 5A-5C. Further, the interiors of the respective pistons may be in airflow communication with interiors of the respective cylinders via one or more orifices of the pistons. As a result, responsive to grasping an object via the central suction cup, the pistons may move within the cylinders to extended positions, thereby moving the coupled stabilizer arms to respective extended positions to grab, stabilize, or hold the grasped object. Furthermore, the suction cups associated with the stabilizer arms may also contact and seal with respective portions of the object based on the application of negative pressure via airflow communication between the suction cups, airflow conduits associated with the stabilizer arms, interiors of the pistons, orifices of the pistons, and interiors of the cylinders. In this manner, the one or more suction cups coupled to respective stabilizer arms may further secure and stabilize the object grasped by the end of arm tool.

In further alternative example embodiments, the example vacuum-actuated pinching mechanism described at least with respect to FIGS. 5A-5C and the example vacuum-actuated stabilizing mechanism described at least with respect to FIGS. 7A-7C may be combined into a single end of arm tool. For example, the central cylinder 721 and central suction cup 723 of FIGS. 7A-7C may be substantially replaced with the pinching mechanism of FIGS. 5A-5C. In this alternative combination, the central pinching mechanism may extend, grasp, retract, and pinch a portion of an object upon application of negative pressure and sealing of the one or more suction cups. Then, responsive to retracting and pinching the portion of the object via the central pinching mechanism, the cylinders and pistons of the stabilizing mechanism may extend one or more stabilizer arms around the object to further secure, hold, and stabilize the grasped object. This and various other possible combinations of the pinching and stabilizing mechanisms described herein may further secure and stabilize the object grasped by the end of arm tool.

In all the example embodiments described to this point, the example end of arm tools may be triggered to move one or more pistons between retracted and extended positions, with corresponding movement of one or more pinching or stabilizing mechanisms, without explicit need for sensors or controllers to identify, detect, and instruct such movement of the pistons. Instead, in all the example embodiments described to this point, the example end of arm tools utilize a vacuum or negative pressure source, e.g., a single negative pressure source, to initiate or trigger movement of one or more pistons between retracted and extended positions. For example, various example embodiments of the example end of arm tools may initiate or trigger movement of one or more pistons between retracted and extended positions based on contact and sealing of one or more suction cups with an object, but notably without need for sensors or controllers to identify, detect, and instruct such movement of the pistons.

In other alternative example embodiments, the example vacuum-actuated stabilizing mechanism for an end of arm tool as described at least with respect to FIGS. 7A-7C may alternatively omit the central suction cup, and include only the cylinders, pistons, and stabilizer arms coupled thereto to grasp, stabilize, and hold an object. In this alternative, the example end of arm tool may effectively simulate a mechanical gripper that is actuated using a single vacuum or negative pressure source or line. However, one or more sensors or controllers, e.g., imaging sensors, proximity or contact sensors, or other types of sensors and associated controllers, may be required in order to initiate or trigger application of negative pressure and movement of the pistons at a desired time to grasp an object using the stabilizer arms.

In still further alternative example embodiments, the example vacuum-actuated stabilizing mechanism for an end of arm tool as described at least with respect to FIGS. 7A-7C may alternatively omit the central suction cup, may include only the cylinders, pistons, and stabilizer arms coupled thereto to grasp, stabilize, and hold an object, and may also include one or more suction cups coupled to respective stabilizer arms. In this alternative, the example end of arm tool may also effectively simulate a mechanical gripper that is actuated using a single vacuum or negative pressure source or line, with the addition of suction cups on respective stabilizer arms that may assist in grasping the object using the stabilizer arms. However, one or more sensors or controllers, e.g., imaging sensors, proximity or contact sensors, or other types of sensors and associated controllers, may be required in order to initiate or trigger application of negative pressure and movement of the pistons at a desired time to grasp an object using the stabilizer arms and associated suction cups.

Any of the various example embodiments described individually herein, as well as the various alternative example embodiments and/or combinations of example embodiments described herein, may be modified and/or combined in various other configurations, arrangements, or combinations to create end of arm tools having one or more pistons movable between retracted and extended positions, one or more suction cups to grasp portions of an object, one or more pinching mechanisms to pinch portions of an object, and/or one or more stabilizing mechanisms to stabilize portions of an object.

Figure 8:
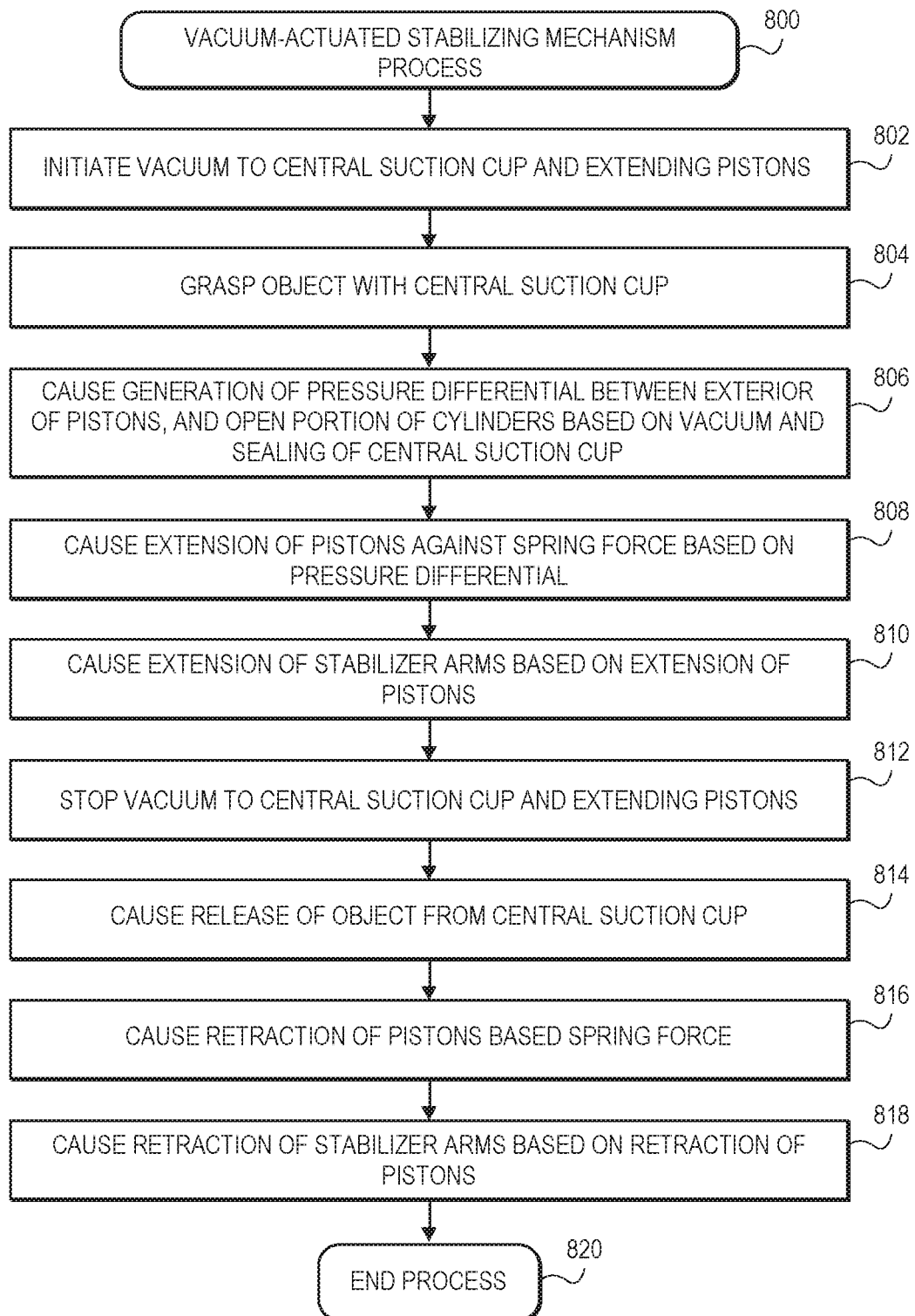
FIG. 8 is a flow diagram illustrating an example vacuum-actuated stabilizing mechanism process, in accordance with implementations of the present disclosure.

FIG. 8 is a flow diagram illustrating an example vacuum-actuated stabilizing mechanism process 800, in accordance with implementations of the present disclosure.

The process 800 may begin by initiating a vacuum to a central suction cup and extending pistons, as at 802. For example, a vacuum or negative pressure source or line may apply negative pressure to an interior of a central cylinder that is in airflow communication with the central suction cup. In addition, at least a portion of the negative pressure may also be applied to interiors of cylinders having extending pistons via one or more connections that permit airflow communication between the interiors of the cylinders and the central cylinder. Further, a control system may instruct or command the various processes associated with initiating a vacuum or negative pressure.

The process 800 may then continue by grasping an object with the central suction cup, as at 804. For example, a robotic arm or other apparatus may move the central cylinder and central suction cup to a position and orientation such that the central suction cup contacts an object. Based on the application of vacuum or negative pressure to the central suction cup, the central cup may contact, seal with, and grasp the object using negative pressure. Further, a control system may instruct or command the various processes associated with grasping an object.

The process 800 may proceed by causing generation of pressure differentials between exteriors of the pistons and open portions of the cylinders based on the vacuum and sealing of the central suction cup, as at 806. For example, due to the sealing of the central suction cup by the grasped object, a reduced or negative pressure may be generated within the interiors of the cylinders, i.e., exteriors of the pistons, via the connections to the central cylinder. In addition, because upper portions of the cylinders are open to the outside environment, the open, upper portions of the cylinders may remain substantially at an ambient or initial pressure, e.g., substantially the same as or close to atmospheric pressure. Further, a control system may instruct or command the various processes associated with initiating a vacuum or negative pressure to cause generation of pressure differentials responsive to grasping an object.

The process 800 may continue to cause extension of the pistons against spring forces based on the pressure differentials, as at 808. For example, the pressure differentials between the interiors of the cylinders and the open, upper portions of the cylinders may apply forces tending to move the pistons from retracted positions to extended positions. In addition, springs within the interiors of the cylinders may apply spring forces tending to move the pistons from the extended positions to the retracted positions. Responsive to the forces based on the pressure differentials exceeding the spring forces applied by the springs, the pistons may move from the retracted positions to the extended positions. Further, a control system may instruct or command the various processes associated with initiating a vacuum or negative pressure to cause extension of pistons responsive to grasping an object.

The process 800 may then proceed to cause extension of the stabilizer arms based on the extension of the pistons, as at 810. For example, responsive to the movement of the pistons from the retracted positions to the extended positions, the stabilizer arms may correspondingly move from retracted or open positions to extended or closed positions. Various movable or rotatable joints of the stabilizer arms may be configured to move and/or rotate responsive to movement of the pistons. In the closed positions of the stabilizer arms, the stabilizer arms may be positioned or oriented in respective closed positions intended to grab, stabilize, or hold an object grasped via the central suction cup. Further, a control system may instruct or command the various processes associated with initiating a vacuum or negative pressure to cause extension of stabilizer arms responsive to grasping an object.

The process 800 may then continue with stopping vacuum to the central suction cup and extending pistons, as at 812. For example, in order to release the grasped object, negative pressure may no longer be applied to central cylinder and central suction cup, as well as to the interiors of the cylinders via the connections to the central cylinder. In some example embodiments, a positive pressure may be applied to the central cylinder and central suction cup in order to remove the vacuum and generate ambient pressure within the central cylinder and central suction cup, as well as within the interiors of the cylinders via the connections to the central cylinder, e.g., at or close to atmospheric pressure. Further, a control system may instruct or command the various processes associated with stopping a vacuum or negative pressure.

The process 800 may proceed with causing release of the object from the central suction cup, as at 814. For example, responsive to stopping the application of negative pressure to the central cylinder and central suction cup, the object may be released from the central suction cup. The object may be released to various downstream stations, processes, or locations. Further, a control system may instruct or command the various processes associated with stopping a vacuum or negative pressure to release an object.

The process 800 may then continue by causing retraction of the pistons based on the spring force, as at 816. For example, responsive to stopping the application of negative pressure to the interiors of the cylinders via the connections to the central cylinder, and responsive to releasing the object from the central suction cup, the pistons may move from the extended positions to the retracted positions due to the spring force applied by the springs that tend to bias the pistons toward the retracted positions. In addition, no pressure differential may be generated between interiors of the cylinders and the open, upper portions of the cylinders in the absence of application of negative pressure. Further, a control system may instruct or command the various processes associated with stopping a vacuum or negative pressure to release an object and cause retraction of the pistons.

The process 800 may then proceed by causing retraction of the stabilizer arms based on the retraction of the pistons, as at 818. For example, responsive to the movement of the pistons from the extended positions to the retracted positions, the stabilizer arms may correspondingly move from extended or closed positions to retracted or open positions. Various movable or rotatable joints of the stabilizer arms may be configured to move and/or rotate responsive to movement of the pistons. In the open positions of the stabilizer arms, the stabilizer arms may be positioned or oriented in respective open positions intended to avoid or remove contact with an object released from the central suction cup. Further, a control system may instruct or command the various processes associated with stopping a vacuum or negative pressure to release an object and cause retraction of stabilizer arms.

The process 800 may then end, as at 820.

Figure 9:
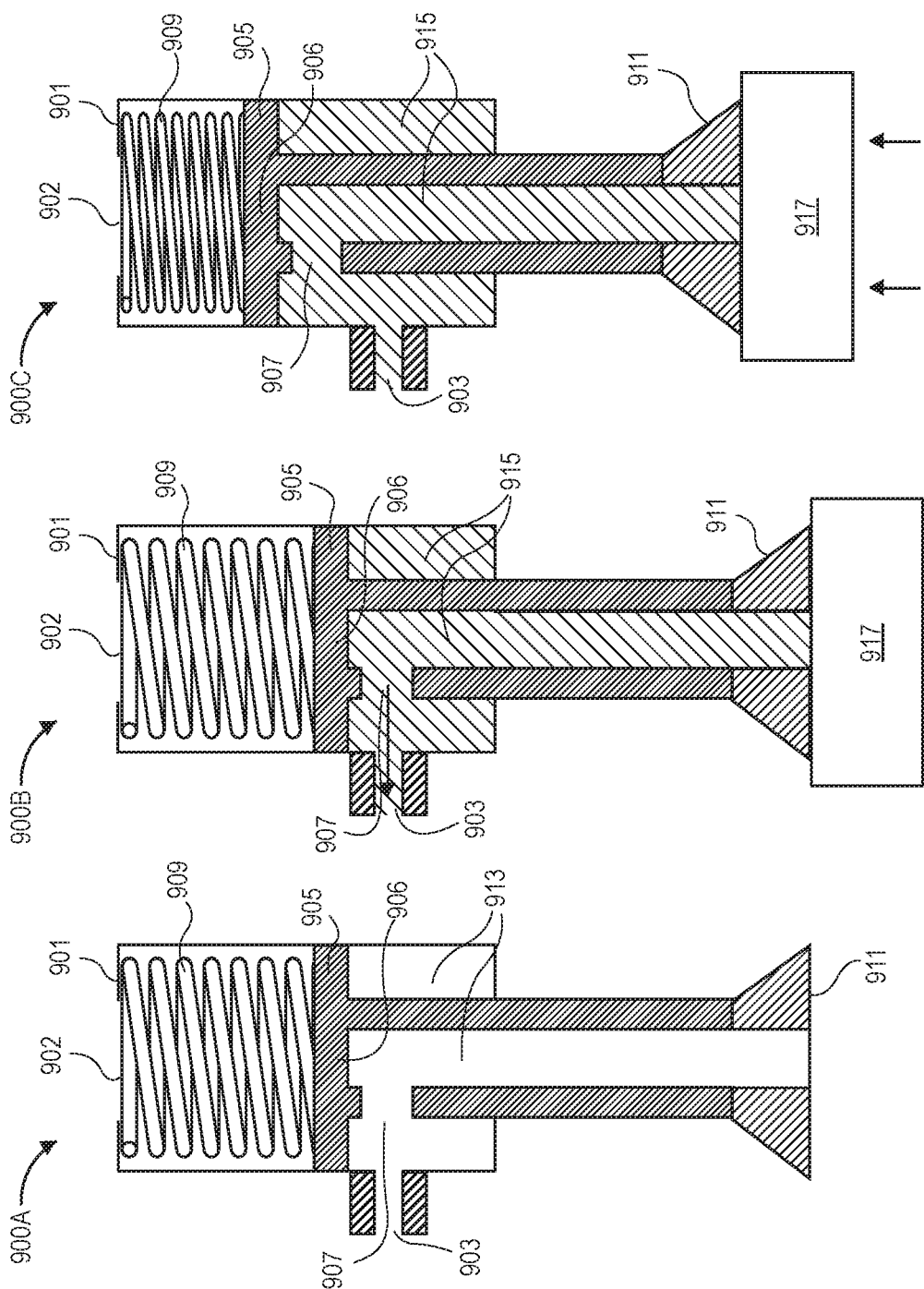
FIGS. 9A-9C are schematic diagrams of an example passively compliant, extended piston for an end of arm tool, in accordance with implementations of the present disclosure.

FIGS. 9A-9C are schematic diagrams 900A, 900B, 900C of an example passively compliant, extended piston for an end of arm tool, in accordance with implementations of the present disclosure.

As shown in FIGS. 9A-9C, an example vacuum-actuated, passively compliant, extended piston for an end of arm tool may include a cylinder 901 and a piston 905 configured to move within the cylinder 901. For example, the cylinder 901 may have a substantially cylindrical shape with an axis of the cylinder 901 extending substantially vertically within the plane of the diagram of FIG. 9A. In addition, the cylinder 901 may have a first, upper end 902 that is open to an outside environment, and may have a second, lower end that is also open to allow extension and retraction of the piston 905. Further, the cylinder 901 may include a connection 903 to a vacuum or negative pressure source or line, via which negative pressure may be applied to an interior of the cylinder 901. The cylinder 901 may be formed of various materials, such as metals, composites, plastics, other materials, or combinations thereof.

The piston 905 may also have a substantially cylindrical shape corresponding to the substantially cylindrical shape of the cylinder 901, with an axis of the piston 905 also extending substantially vertically within the plane of the diagram of FIG. 9A. For example, the piston 905 may be configured to move between an extended position, as shown in FIGS. 9A and 9B, and an at least partially retracted or compressed position, as shown in FIG. 9C, substantially along the axes of the cylinder 901 and piston 905. In addition, the piston 905 may have a first, upper end 906 that is closed to an upper portion of the cylinder 901 and outside environment, and may have a second, lower end that is open to an outside environment. Further, the piston 905 may also include one or more orifices 907 that permit airflow communication between the connection 903 to the vacuum or negative pressure source or line, the interior of the cylinder 901, and an interior of the piston 905. The piston 905 may be formed of various materials, such as metals, composites, plastics, other materials, or combinations thereof.

In example embodiments, a spring 909 may be positioned within an upper portion of the cylinder 901. For example, the spring 909 may be positioned between a first, open, upper end 902 of the cylinder 901 and a first, closed, upper end 906 of the piston 905. In addition, the spring 909 may apply a spring force to the piston 905 to bias the piston 905 toward the extended position relative to the cylinder 901, as shown in FIGS. 9A and 9B. In some example embodiments, the spring 909 may comprise a compression spring configured to apply a spring force to the piston 905 toward the extended position. The spring 909 may be formed of various materials, such as metals, composites, plastics, other materials, or combinations thereof.

Furthermore, a suction cup 911 may be coupled to the second, lower end of the piston 905. For example, the suction cup 911 may facilitate grasping of objects using negative pressure applied by the negative pressure source via the connection 903, the interior of the cylinder 901, the one or more orifices 907, and the interior of the piston 905. The suction cup 911 may be formed of various materials, such as rubber, silicone, plastics, composites, metals, other flexible or resilient materials, or combinations thereof.

As shown in FIG. 9A, the example vacuum-actuated, passively compliant, extended piston for an end of arm tool may be in an ambient or initial state in which negative pressure is not being applied to the interior of the cylinder 901 via the connection 903. In the initial state of the example vacuum-actuated, passively compliant, extended piston, the interior of the cylinder 901 and the interior of the piston 905 may have an ambient or initial pressure 913, which may be substantially the same as atmospheric pressure. Because of the spring force applied by the spring 909 to the piston 905 to bias the piston 905 toward the extended position, the piston 905 may be positioned in the extended position, as shown in FIG. 9A.

As shown in FIG. 9B, the example vacuum-actuated, passively compliant, extended piston for an end of arm tool may be in an activated and grasped state in which negative pressure is being applied to the interior of the cylinder 901 via the connection 903. In the activated and grasped state of the example vacuum-actuated extending piston, the interior of the cylinder 901 may have a reduced or negative pressure 915 due to the application of negative pressure via the connection 903. In addition, responsive to grasping an object 917 via the suction cup 911, the interior of the piston 905 may also have a reduced or negative pressure 915 due to the application of negative pressure via the connection 903, the interior of the cylinder 901, and the one or more orifices 907 of the piston 905. As a result, a pressure differential may be generated between the interior of the cylinder 901 proximate the second end of the cylinder and the interior of the piston 905, e.g., the reduced or negative pressure 915, and the upper portion of the cylinder 901 that is open to an outside environment, e.g., atmospheric pressure. Because of the pressure differential generated between the interiors of the cylinder 901 and the piston 905 and the open, upper portion of the cylinder 901, an additional force may be applied to the piston 905 that may tend to move or bias the piston 905 toward the extended position, as shown in FIG. 9B. In addition, the additional force applied to the piston 905 based on the pressure differential may be substantially in the same direction as the spring force applied to the piston 905 by the spring 909 toward the extended position. Thus, responsive to application of negative pressure and responsive to grasping an object 917, the example vacuum-actuated, passively compliant, extended piston for an end of arm tool may remain in the extended position, as shown in FIG. 9B.

As shown in FIG. 9C, the example vacuum-actuated, passively compliant, extended piston for an end of arm tool may be in a grasped and perturbed state in which negative pressure is being applied to the interior of the cylinder 901 via the connection 903, and an object 917 may be grasped via the suction cup 911 using suction, vacuum, or negative pressure. In the grasped state of the example vacuum-actuated, passively compliant, extended piston, the interior of the cylinder 901 may have a reduced or negative pressure 915 due to the application of negative pressure via the connection 903. In addition, due to the airflow communication between the interior of the piston 905 and the interior of the cylinder 901 via the one or more orifices 907, the interior of the piston 905 may also have a reduced or negative pressure 915, which may be substantially the same as or close to the reduced pressure within the interior of the cylinder 901. As a result, responsive to grasping the object 917 via the suction cup 911, a pressure equalization may occur between the interior of the cylinder 901 proximate the second end of the cylinder, e.g., the reduced or negative pressure 915, and the interior of the piston 905, e.g., substantially the same reduced or negative pressure 915. Because of the pressure equalization between the interior of the cylinder 901 and the interior of the piston 905 to the reduced or negative pressure 915, the object 917 may be securely grasped by the suction cup 911. In addition, the pressure differential may be maintained between the interior of the cylinder 901 proximate the second end of the cylinder, e.g., the reduced or negative pressure 915, and the open, upper portion of the cylinder 901 proximate the first end of the cylinder, e.g., atmospheric pressure. Because of the pressure differential that is maintained between the interior of the cylinder 901 and the open, upper portion of the cylinder 901, an additional force may continue to be applied to the piston 905 that may tend to maintain the piston 905 in the extended position. In addition, the additional force that may continue to be applied to the piston 905 based on the pressure differential may be substantially in the same direction as the spring force applied to the piston 905 by the spring 909 toward the extended position, such that the example vacuum-actuated, passively compliant, extended piston for an end of arm tool may remain in the extended position due to the spring force and the additional force based on the pressure differential, substantially as shown in FIG. 9C.

Further, responsive to an external force, acceleration, or perturbation that may be applied to the object 917, as indicated by the upward arrows illustrated in FIG. 9C, the piston 905 may passively move at least partially toward the retracted position, in a direction counter to the spring force applied by the spring 909 to the piston 905, as well as counter to an additional force applied to the piston 905 based on the pressure differential. Because the piston 905 is maintained in the extended position due to the spring force and the additional force based on the pressure differential, the passive movement toward the retracted position responsive to external forces or accelerations may provide a level of passive compliance to the grasped object, end of arm tool, and/or associated robotic arm or other movement device, thereby enabling a secure yet compliant grasp of the object 917. Further, the passive compliance may also potentially reduce wear and tear on the end of arm tool and/or associated robotic arm and/or prevent or reduce damage to the grasped object 917, as a result of external forces, accelerations, or perturbations.

In order to release the grasped object 917, negative pressure may no longer be applied to the interiors of the cylinder 901 and piston 905 via the connection 903 and the one or more orifices 907. In some example embodiments, the negative pressure source or line may instead apply positive pressure to the interiors of the cylinder 901 and piston 905 via the connection 903 and the one or more orifices 907 to remove the vacuum or negative pressure and to generate a substantially ambient or initial pressure within the interiors of the cylinder 901 and piston 905, e.g., at or close to atmospheric pressure. Responsive to stopping the application of negative pressure, the object 917 may be released from the suction cup 911, e.g., to a downstream station or process. In addition, responsive to stopping the application of negative pressure, a pressure differential may no longer be generated between the interiors of the cylinder 901 and piston 905 and the open, upper portion of the cylinder 901. Further, due to the spring force applied by the spring 909 to the piston 905, the piston 905 may remain in the extended position, as shown in FIG. 9A.

In this manner, the vacuum-actuated, passively compliant, extended piston may utilize a single vacuum or negative pressure source or line to cause grasping of an object by a suction cup. In addition, by biasing the piston toward the extended position by a spring force, and by maintaining the piston in the extended position responsive to grasping an object via the suction cup, the object may be grasped and held at a known position and orientation relative to the end of arm tool. In example embodiments, grasping an object at a known position and orientation relative to the end of arm tool may facilitate subsequent processes or operations, such as moving or manipulating the object in space without interferences or collisions, holding the object in a particular position and orientation relative to another system, device, sensor, or object, placing or transferring the object to a downstream machine, apparatus, or surface, releasing the object to a downstream process, and/or various other processes.

Further, by maintaining the piston in the extended position responsive to grasping an object via the suction cup, accelerations or forces that may tend to detach, dislodge, or cause release of the object from the suction cup due to retraction of the piston may be avoided. Moreover, the extended position of the piston may provide some level of compliance responsive to external forces or accelerations applied to the grasped object that may tend to compress the piston, e.g., due to inadvertent interferences or collisions between the object and another machine, apparatus, system, device, sensor, or object.

In example embodiments, the number, size, diameter, configuration, arrangement, and/or other characteristics of the one or more orifices 907 of the piston 905 may be tuned or modified to adjust or control a suction force used to grasp objects by the suction cup 911 due to application of vacuum or negative pressure. For example, increasing the number, size, diameter, and/or other characteristics of the one or more orifices 907 of the piston 905 may generally increase the suction force applied by the suction cup 911 to grasp objects. Likewise, decreasing the number, size, diameter, and/or other characteristics of the one or more orifices 907 of the piston 905 may generally decrease the suction force applied by the suction cup 911 to grasp objects.

In additional example embodiments, the number, size, diameter, configuration, arrangement, and/or other characteristics of the one or more orifices 907 of the piston 905 may be tuned or modified to adjust or control a pressure differential generated between the interior of the cylinder 901 and the open, upper portion of the cylinder due to application of vacuum or negative pressure. For example, decreasing the number, size, diameter, and/or other characteristics of the one or more orifices 907 of the piston 905 may generally increase the pressure differential between the interior of the cylinder 901 and the open, upper portion of the cylinder. Likewise, increasing the number, size, diameter, and/or other characteristics of the one or more orifices 907 of the piston 905 may generally decrease the pressure differential between the interior of the cylinder 901 and the open, upper portion of the cylinder.

In further example embodiments, the number, size, spring constant, material, coil diameter, and/or other characteristics of the spring 909 within the upper portion of the cylinder 901 may be tuned or modified to adjust or control a spring force applied by the spring 909 to the piston 905 toward the extended position. For example, increasing the number, size, spring constant, coil diameter, and/or other characteristics of the spring 909 may generally increase the spring force applied by the spring 909. Likewise, decreasing the number, size, spring constant, coil diameter, and/or other characteristics of the spring 909 may generally decrease the spring force applied by the spring 909. In addition, although the spring 909 is generally described herein as a compression spring within an upper portion of the cylinder 901, in other example embodiments, the spring 909 may comprise other types of springs, such as tension springs, leaf springs, torsion springs, or other types of springs, and may be positioned or oriented in different manners, as long as the spring 909 applies a spring force to bias the piston 905 toward the extended position. For example, the spring 909 may alternatively comprise a tension spring positioned within the cylinder 901 between an upper flange, lip, or portion of the piston 905 and a second, lower end of the cylinder 901 that applies a spring force to bias the piston 905 toward the extended position.

In other example embodiments, cylinder dimensions, cylinder volume, piston dimensions, piston volume, piston head area, and/or other characteristics of the cylinder and/or piston may be tuned or modified to adjust or control a suction force used to grasp objects by the suction cup and/or a pressure differential generated between the interior of the cylinder and the open, upper portion of the cylinder due to application of vacuum or negative pressure. For example, a larger piston head area and/or piston volume may generally increase the suction force applied by the suction cup to grasp objects. Likewise, a smaller piston head area and/or piston volume may generally decrease the suction force applied by the suction cup to grasp objects. In addition, a larger cylinder volume may generally increase the pressure differential generated between the interior of the cylinder and the open, upper portion of the cylinder. Likewise, a smaller cylinder volume may generally decrease the pressure differential generated between the interior of the cylinder and the open, upper portion of the cylinder.

Various characteristics of the one or more orifices, the spring, the cylinder, and/or the piston may be modified in various combinations in order to tune or modify generation of pressure differentials, applied spring forces, amounts or levels of passive compliance, piston retraction, piston extension, grasping of objects via suction cups, and/or other aspects of the example end of arm tools described herein.

Figure 10:
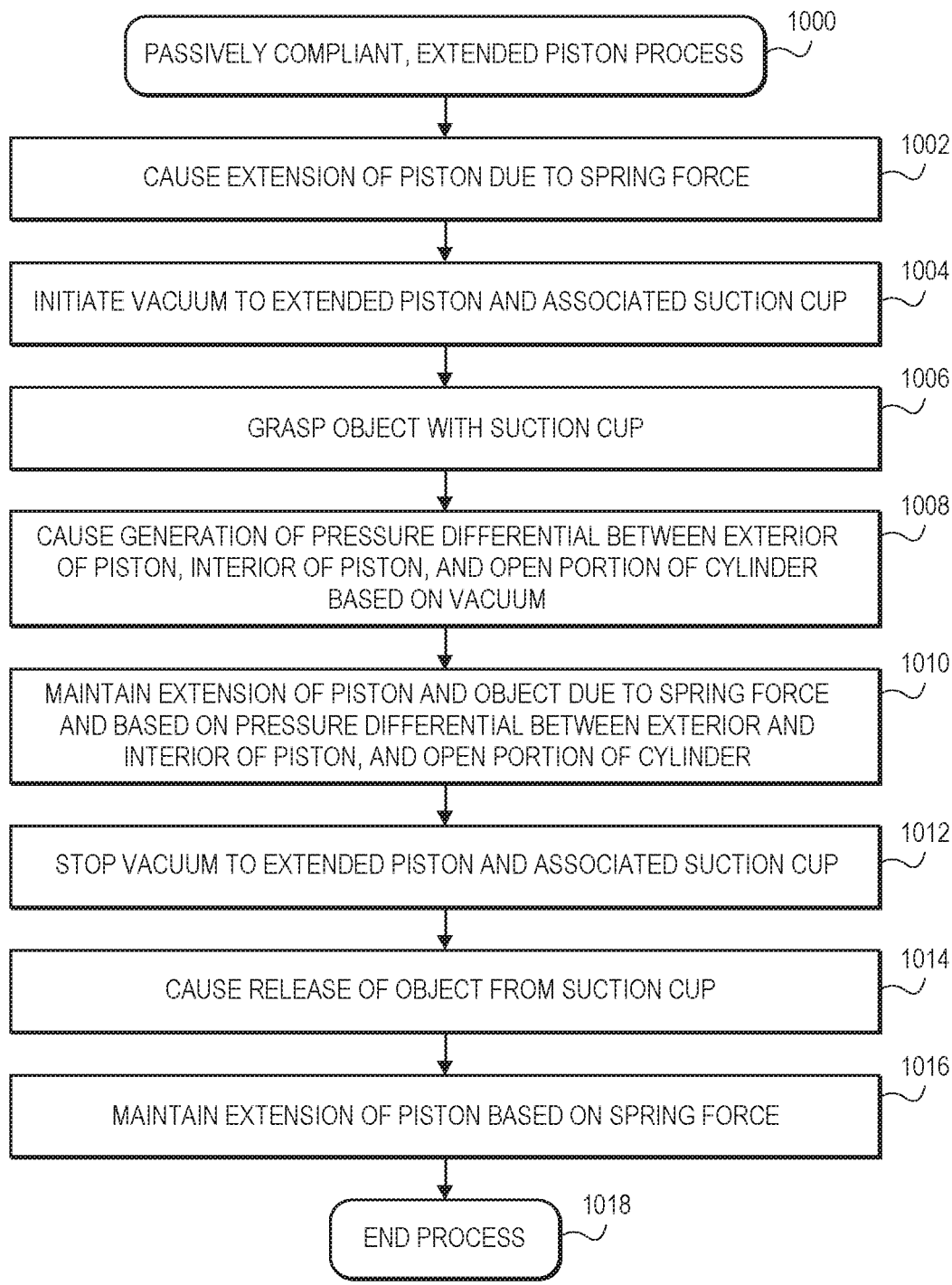
FIG. 10 is a flow diagram illustrating an example passively compliant, extended piston process, in accordance with implementations of the present disclosure.

FIG. 10 is a flow diagram illustrating an example passively compliant, extended piston process 1000, in accordance with implementations of the present disclosure.

The process 1000 may begin by causing extension of a piston due to a spring force, as at 1002. For example, a spring associated with the cylinder and piston may apply a spring force to the piston tending to move or bias the piston from a retracted position toward an extended position. Responsive to the spring force, the piston may move and be positioned in the extended position, e.g., in an ambient or initial state. Further, a control system may instruct or command the various processes associated with causing extension of a piston due to a spring force.

The process 1000 may continue by initiating a vacuum to an extended piston and associated suction cup, as at 1004. For example, a vacuum or negative pressure source or line may apply negative pressure to an interior of a cylinder via a connection. In addition, at least a portion of the negative pressure may also be applied to an interior of an extended piston and associated suction cup via one or more orifices of the piston that permit airflow communication between the interior of the cylinder and the interior of the piston. Further, a control system may instruct or command the various processes associated with initiating a vacuum or negative pressure.

The process 1000 may then proceed by grasping an object with the suction cup, as at 1006. For example, a robotic arm or other apparatus may move the extended piston and associated suction cup to a position and orientation such that the suction cup contacts an object. Based on the application of vacuum or negative pressure to the suction cup, the suction cup may contact, seal with, and grasp the object using negative pressure. Further, a control system may instruct or command the various processes associated with grasping an object.

The process 1000 may continue to cause generation of a pressure differential between an exterior of the piston, an interior of the piston, and an open portion of the cylinder based on the vacuum, as at 1008. For example, due to application of the vacuum or negative pressure to the interior of the cylinder, i.e., exterior of the piston, a reduced or negative pressure may be generated within the interior of the cylinder. In addition, responsive to grasping the object via the suction cup, a reduced or negative pressure may also be generated within the interior of the extended piston and associated suction cup due to the airflow communication between the interior of the piston and the interior of the cylinder via the one or more orifices. Further, because an upper portion of the cylinder is open to the outside environment, the open, upper portion of the cylinder may remain substantially at an ambient or initial pressure, e.g., substantially the same as or close to atmospheric pressure. As a result, responsive to application of negative pressure and responsive to grasping an object via the suction cup, a pressure differential may be generated between interiors of the cylinder and piston and the open, upper portion of the cylinder, in which the pressure differential may apply an additional force tending to maintain or bias the piston toward the extended position. Further, a control system may instruct or command the various processes associated with initiating a vacuum or negative pressure to cause generation of a pressure differential.

The process 1000 may then proceed to maintain extension of the piston and object due to the spring force and based on the pressure differential between the exterior and interior of the piston, and the open portion of the cylinder, as at 1010. For example, responsive to grasping the object with the suction cup, the pressure within the interior of the extended piston may substantially equalize with the pressure within the interior of the cylinder via the one or more orifices that permit airflow communication therebetween. In addition, due to the application of vacuum or negative pressure via the connection to the interior of the cylinder, the interiors of the cylinder and piston may substantially equalize to a reduced or negative pressure. Moreover, the open, upper portion of the cylinder may remain substantially at an ambient or initial pressure, e.g., substantially the same as or close to atmospheric pressure. Thus, due to the pressure differential between the reduced or negative pressure within the interiors of the cylinder and piston and the ambient or initial pressure of the open, upper portion of the cylinder, an additional force based on the pressure differential may continue to be applied to the piston toward the extended position. As a result, the piston may remain in the extended position due to the spring force applied by the spring to the piston toward the extended position, as well as due to the additional force based on the pressure differential applied to the piston substantially in the same direction as the spring force toward the extended position. Further, a control system may instruct or command the various processes associated with initiating a vacuum or negative pressure to grasp an object and maintain extension of the piston.

The process 1000 may then continue with stopping vacuum to the extended piston and associated suction cup, as at 1012. For example, in order to release the grasped object, negative pressure may no longer be applied to the interiors of the cylinder and piston. In some example embodiments, a positive pressure may be applied to the interiors of the cylinder and piston in order to remove the vacuum and generate ambient pressure within the interiors of the cylinder and piston, e.g., at or close to atmospheric pressure. Further, a control system may instruct or command the various processes associated with stopping a vacuum or negative pressure.

The process 1000 may proceed with causing release of the object from the suction cup, as at 1014. For example, responsive to stopping the application of negative pressure to the interiors of the cylinder and piston, the object may be released from the suction cup. The object may be released to various downstream stations, processes, or locations. Further, a control system may instruct or command the various processes associated with stopping a vacuum or negative pressure to release an object.

The process 1000 may then continue by maintaining extension of the piston based on the spring force, as at 1016. For example, responsive to stopping the application of negative pressure to the interiors of the cylinder and piston, and responsive to releasing the object from the suction cup, the piston may remain in the extended position due to the spring force applied by the spring that tends to bias the piston toward the extended position. In addition, no pressure differential may be generated between interiors of the cylinder and piston and the open, upper portion of the cylinder in the absence of application of negative pressure. Further, a control system may instruct or command the various processes associated with stopping a vacuum or negative pressure to release an object and maintain extension of the piston.

The process 1000 may then end, as at 1018.

Figure 11:
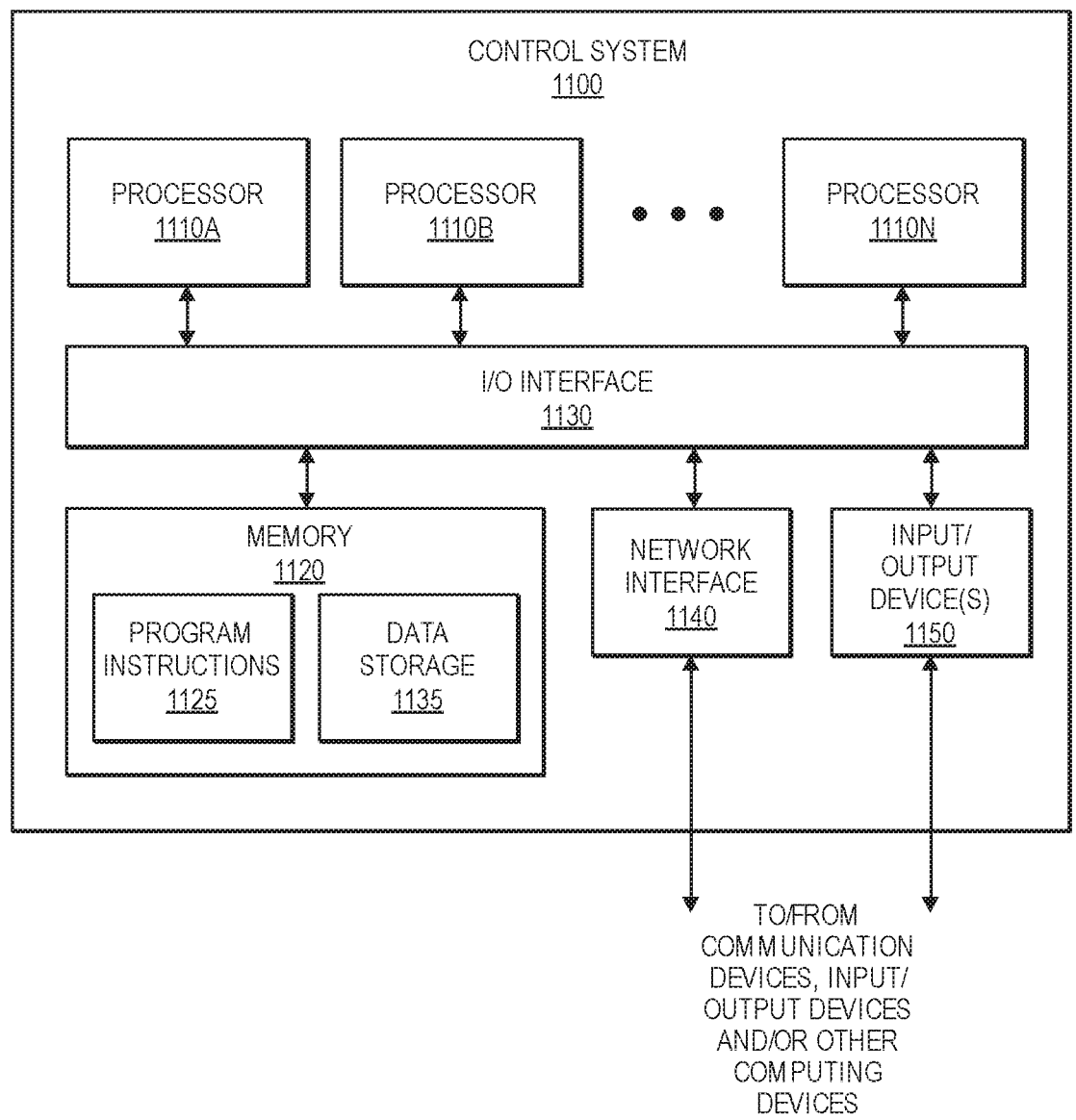
FIG. 11 is a block diagram illustrating various components of an example control system, in accordance with implementations of the present disclosure.

FIG. 11 is a block diagram illustrating various components of an example control system 1100, in accordance with implementations of the present disclosure.

Various operations of a control system or controller, such as those described herein, may be executed on one or more computer systems, and/or interacting with various other computers, systems, or devices in a material handling facility, according to various implementations. For example, the control system or controller discussed above may function and operate on one or more computer systems. One such control system is illustrated by the block diagram in FIG. 11. In the illustrated implementation, a control system 1100 includes one or more processors 1110A, 1110B through 1110N, coupled to a non-transitory computer-readable storage medium 1120 via an input/output (I/O) interface 1130. The control system 1100 further includes a network interface 1140 coupled to the I/O interface 1130, and one or more input/output devices 1150. In some implementations, it is contemplated that a described implementation may be implemented using a single instance of the control system 1100 while, in other implementations, multiple such systems or multiple nodes making up the control system 1100 may be configured to host different portions or instances of the described implementations. For example, in one implementation, some data sources or services (e.g., related to portions of vacuum-actuated object grasping systems, operations, or processes, etc.) may be implemented via one or more nodes of the control system 1100 that are distinct from those nodes implementing other data sources or services (e.g., related to other portions of vacuum-actuated object grasping systems, operations, or processes, etc.).

In various implementations, the control system 1100 may be a uniprocessor system including one processor 1110A, or a multiprocessor system including several processors 1110A-1110N (e.g., two, four, eight, or another suitable number). The processors 1110A-1110N may be any suitable processor capable of executing instructions. For example, in various implementations, the processors 1110A-1110N may be general-purpose or embedded processors implementing any of a variety of instruction set architectures (ISAs), such as the x86, PowerPC, SPARC, or MIPS ISAs, or any other suitable ISA. In multiprocessor systems, each of the processors 1110A-1110N may commonly, but not necessarily, implement the same ISA.

The non-transitory computer-readable storage medium 1120 may be configured to store executable instructions and/or data accessible by the one or more processors 1110A-1110N. In various implementations, the non-transitory computer-readable storage medium 1120 may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions and/or processes, such as those described above, are shown stored within the non-transitory computer-readable storage medium 1120 as program instructions 1125 and data storage 1135, respectively. In other implementations, program instructions and/or data may be received, sent or stored upon different types of computer-accessible media, such as non-transitory media, or on similar media separate from the non-transitory computer-readable storage medium 1120 or the control system 1100. Generally speaking, a non-transitory, computer-readable storage medium may include storage media or memory media such as magnetic or optical media, e.g., disk or CD/DVD-ROM, coupled to the control system 1100 via the I/O interface 1130. Program instructions and data stored via a non-transitory computer-readable medium may be transmitted by transmission media or signals such as electrical, electromagnetic, or digital signals, which may be conveyed via a communication medium such as a network and/or a wireless link, such as may be implemented via the network interface 1140.

In one implementation, the I/O interface 1130 may be configured to coordinate I/O traffic between the processors 1110A-1110N, the non-transitory computer-readable storage medium 1120, and any peripheral devices, including the network interface 1140 or other peripheral interfaces, such as input/output devices 1150. In some implementations, the I/O interface 1130 may perform any necessary protocol, timing or other data transformations to convert data signals from one component (e.g., non-transitory computer-readable storage medium 1120) into a format suitable for use by another component (e.g., processors 1110A-1110N). In some implementations, the I/O interface 1130 may include support for devices attached through various types of peripheral buses, such as a variant of the Peripheral Component Interconnect (PCI) bus standard or the Universal Serial Bus (USB) standard, for example. In some implementations, the function of the I/O interface 1130 may be split into two or more separate components, such as a north bridge and a south bridge, for example. Also, in some implementations, some or all of the functionality of the I/O interface 1130, such as an interface to the non-transitory computer-readable storage medium 1120, may be incorporated directly into the processors 1110A-1110N.

The network interface 1140 may be configured to allow data to be exchanged between the control system 1100 and other devices attached to a network, such as other control systems, material handling system controllers, warehouse management systems, other computer systems, robotic arms, machines, or systems, object grasping apparatus, machines, or systems (and components thereof), various types of sensors, various types of vision systems, imaging devices, or imaging sensors, upstream stations or processes, downstream stations or processes, other material handling systems or equipment, or between nodes of the control system 1100. In various implementations, the network interface 1140 may support communication via wired or wireless general data networks, such as any suitable type of Ethernet network.

Input/output devices 1150 may, in some implementations, include one or more displays, projection devices, visual input/output devices, audio input/output devices, keyboards, keypads, touchpads, scanning devices, imaging devices, sensors, photo eyes, proximity sensors, RFID readers, voice or optical recognition devices, or any other devices suitable for entering or retrieving data by one or more control systems 1100. Multiple input/output devices 1150 may be present in the control system 1100 or may be distributed on various nodes of the control system 1100. In some implementations, similar input/output devices may be separate from the control system 1100 and may interact with one or more nodes of the control system 1100 through a wired or wireless connection, such as over the network interface 1140.

As shown in FIG. 11, the memory 1120 may include program instructions 1125 that may be configured to implement one or more of the described implementations and/or provide data storage 1135, which may comprise various tables, data stores and/or other data structures accessible by the program instructions 1125. The program instructions 1125 may include various executable instructions, programs, or applications to facilitate vacuum-actuated object grasping operations and processes described herein, such as movement device or robotic arm, machine, or apparatus controllers, drivers, or applications, vacuum or negative pressure source controllers, drivers, or applications, object grasping apparatus end of arm tool controllers, drivers, or applications, actuator controllers, drivers, or applications, sensor controllers, drivers, or applications, sensor data processing applications, vision system or imaging device controllers, drivers, or applications, imaging data processing applications, material handling equipment controllers, drivers, or applications, upstream station controllers, drivers, or applications, downstream station controllers, drivers, or applications, etc. The data storage 1135 may include various data stores for maintaining data related to systems, operations, or processes described herein, such as movement devices, robotic arms, machines, or apparatus, vacuum or negative pressure sources or lines, object grasping apparatus end of arm tools, actuators, sensors, sensor data, vision systems or imaging devices, imaging data, objects, object data, material handling equipment or apparatus, upstream systems, stations, or processes, downstream systems, stations, or processes, etc.

Those skilled in the art will appreciate that the control system 1100 is merely illustrative and is not intended to limit the scope of implementations. In particular, the control system and devices may include any combination of hardware or software that can perform the indicated functions, including other control systems or controllers, computers, network devices, internet appliances, robotic devices, etc. The control system 1100 may also be connected to other devices that are not illustrated, or instead may operate as a stand-alone system. In addition, the functionality provided by the illustrated components may, in some implementations, be combined in fewer components or distributed in additional components. Similarly, in some implementations, the functionality of some of the illustrated components may not be provided and/or other additional functionality may be available.

It should be understood that, unless otherwise explicitly or implicitly indicated herein, any of the features, characteristics, alternatives or modifications described regarding a particular implementation herein may also be applied, used, or incorporated with any other implementation described herein, and that the drawings and detailed description of the present disclosure are intended to cover all modifications, equivalents and alternatives to the various implementations as defined by the appended claims. Moreover, with respect to the one or more methods or processes of the present disclosure described herein, including but not limited to the flow charts shown in FIGS. 2, 4, 6, 8, and 10, orders in which such methods or processes are presented are not intended to be construed as any limitation on the claimed inventions, and any number of the method or process steps or boxes described herein can be omitted, reordered, or combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain implementations could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation.

The elements of a method, process, or algorithm described in connection with the implementations disclosed herein can be embodied directly in hardware, in a software module stored in one or more memory devices and executed by one or more processors, or in a combination of the two. A software module can reside in RAM, flash memory, ROM, EPROM, EEPROM, registers, a hard disk, a removable disk, a CD ROM, a DVD-ROM or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative implementations thereof, the foregoing and various other additions and omissions may be made therein and thereto without departing from the spirit and scope of the present disclosure.

What is claimed is:

1. A vacuum-actuated end of arm tool, comprising:
   a cylinder having a first end open to atmosphere and a second end opposite the first end, the cylinder including a connection configured to apply negative pressure to an interior of the cylinder proximate the second end of the cylinder;
   a single piston configured to move within the cylinder between a retracted position and an extended position, the single piston including at least one orifice configured to permit airflow communication between an interior of the single piston and the interior of the cylinder proximate the second end of the cylinder;
   wherein:
      the single piston includes a first closed end configured to align with the first end of the cylinder, the first closed end of the single piston extending across the interior of the cylinder and preventing airflow communication between the first end of the cylinder and the interior of the cylinder; and
      the single piston includes a second open end configured to extend from the second end of the cylinder, the second open end being in airflow communication with the interior of the single piston;
   a spring within the interior of the cylinder, the spring configured to apply a spring force to bias the single piston toward the retracted position; and a suction cup associated with the second open end of the single piston, the suction cup configured to grasp an object responsive to application of the negative pressure.

2. The vacuum-actuated end of arm tool of claim 1, wherein the interior of the single piston and the interior of the cylinder proximate the second end of the cylinder are in airflow communication with each other; and
wherein the first end of the cylinder is not in airflow communication with the second end of the cylinder.

3. The vacuum-actuated end of arm tool of claim 1, wherein the spring is positioned within the interior of the cylinder between the first closed end of the single piston and the second end of the cylinder.

4. The vacuum-actuated end of arm tool of claim 1, wherein the at least one orifice of the single piston comprises a plurality of orifices configured to permit airflow communication between the interior of the sine piston and the interior of the cylinder proximate the second end of the cylinder.

5. An apparatus, comprising:
a cylinder having a first open end and a second end opposite the first open end, the cylinder including a connection configured to apply negative pressure to a interior of the cylinder; and
a single piston configured to move within the cylinder between a retracted position and an extended position, the single piston including at least one orifice configured to permit airflow communication between an interior of the sine piston and the interior of the cylinder;
wherein the single piston includes a first closed end configured to align with the first open end of the cylinder, the first closed end of the single piston extending across the interior of the cylinder and preventing airflow communication between the first open end of the cylinder and the interior of the cylinder; and
wherein the single piston includes a second open end configured to extend from the second end of the cylinder, the second open end being in airflow communication with the interior of the single piston.

6. The apparatus of claim 5, further comprising:
a suction cup associated with the second open end of the single piston, the suction cup configured to grasp an object responsive to application of the negative pressure.

7. The apparatus of claim 6, further comprising:
a spring within the interior of the cylinder, the spring configured to apply a spring force to bias the single piston toward the retracted position.

8. The apparatus of claim 7, wherein responsive to application of the negative pressure, a first pressure differential is generated between the interior of the cylinder and the first open end of the cylinder.

9. The apparatus of claim 8, wherein responsive to the first pressure differential generating a force upon the single piston that is greater than the spring force, the single piston moves to the extended position against the spring force.

10. The apparatus of claim 9, wherein responsive to application of the negative pressure, a second pressure differential is generated between the interior of the single piston and the interior of the cylinder, the second pressure differential being less than the first pressure differential.

11. The apparatus of claim 10, wherein responsive to grasping of the object by the suction cup, the first and second pressure differentials equalize to a third pressure differential between the first open end of the cylinder and respective interiors of the cylinder and the in piston.

12. The apparatus of claim 11, wherein responsive to the third pressure differential generating a force upon the single piston that is greater than the spring force subsequent to grasping of the object, the single piston remains in the extended position against the spring force.

13. The apparatus of claim 12, wherein responsive to stopping application of the negative pressure, the object is released by the suction cup, and the single piston moves to the retracted position due to the spring force.

14. The apparatus of claim 7, wherein the spring is positioned within the interior of the cylinder between the first closed end of the single piston and the second end of the cylinder.

15. The apparatus of claim 5, wherein the at least one orifice of the single piston comprises a plurality of orifices configured to permit airflow communication between the interior of the single piston and the interior of the cylinder.

16. A method to grasp an object, comprising:
applying, by a controller, negative pressure to an interior of a cylinder, the cylinder having a first open end and a second end opposite the first open end;
causing generation of a first pressure differential between the interior of the cylinder and the first open end of the cylinder based on the negative pressure; and
causing extension of a single piston within the cylinder from a retracted position to an extended position based on the first pressure differential, the single piston including at least one orifice configured to permit airflow communication between an interior of the single piston and the interior of the cylinder;
wherein the single piston includes a first closed end configured to align with the first open end of the cylinder, the first closed end of the single piston extending across the interior of the cylinder and preventing airflow communication between the first open end of the cylinder and the interior of the cylinder; and
wherein the single piston includes a second open end configured to extend from the second end of the cylinder, the second open end being in airflow communication with the interior of the single piston.

17. The method of claim 16, wherein the first pressure differential generates a force upon the single piston toward the extended position that is greater than a spring force applied to the single piston, by a spring within the interior of the cylinder, toward the retracted position.

18. The method of claim 17, further comprising:
causing generation of a second pressure differential between the interior of the single piston and the interior of the cylinder based on the negative pressure, the second pressure differential being less than the first pressure differential.

19. The method of claim 18, further comprising:
causing grasping, by the controller, of an object by a suction cup associated with the second open end of the single piston.

20. The method of claim 19, further comprising:
causing equalization of the first and second pressure differentials to a third pressure differential between the first open end of the cylinder and respective interiors of the cylinder and the single piston based on the grasping of the object; and
causing the single piston to remain in the extended position based on the third pressure differential;
wherein the third pressure differential generates a force upon the single piston toward the extended position that is greater than the spring force applied to the single piston, by the spring within the interior of the cylinder, toward the retracted position.

* * * * *